(12) United States Patent
Petrangeli et al.

(10) Patent No.: US 9,376,308 B2
(45) Date of Patent: Jun. 28, 2016

(54) FLEXIBLE MEMBRANE VALVE, IN PARTICULAR FOR BACKFLOW PREVENTION

(75) Inventors: Gabriele Petrangeli, Cittaducale (IT); Stefano Livoti, Cittaducale (IT)

(73) Assignee: SEKO S.P.A. (IT)

( * ) Notice: Subject to any disclaimer, the term of this patent is extended or adjusted under 35 U.S.C. 154(b) by 224 days.

(21) Appl. No.: 14/233,533

(22) PCT Filed: Jul. 19, 2012

(86) PCT No.: PCT/IB2012/053699
§ 371 (c)(1),
(2), (4) Date: Jan. 17, 2014

(87) PCT Pub. No.: WO2013/011484
PCT Pub. Date: Jan. 24, 2013

(65) Prior Publication Data
US 2014/0158241 A1  Jun. 12, 2014

(30) Foreign Application Priority Data

Jul. 20, 2011 (IT) .............................. RM2011A0384

(51) Int. Cl.
*F16K 15/14* (2006.01)
*B67D 7/74* (2010.01)
(Continued)

(52) U.S. Cl.
CPC ................ *B67D 7/74* (2013.01); *B01F 3/0865* (2013.01); *B01F 5/0428* (2013.01); *F16K 15/14* (2013.01); *F16K 15/145* (2013.01); *B01F 2005/0446* (2013.01); *Y10T 137/7879* (2015.04)

(58) Field of Classification Search
CPC .................................. F16K 15/14; B67D 7/74
USPC ............... 137/218, 526, 849, 888; 222/145.1; 251/149.6, 149.7
See application file for complete search history.

(56) References Cited

U.S. PATENT DOCUMENTS 2,663,309 A * 12/1953 Filliung ................... B63H 1/04
                                                     137/218
2,746,477 A   5/1956 Krause et al.
(Continued)

FOREIGN PATENT DOCUMENTS

DE      1824921      1/1961
EP      0284805     10/1988
(Continued)

OTHER PUBLICATIONS

International Search Report mailed Nov. 26, 2012, for PCT/IB2012/053699.

*Primary Examiner* — John K Fristoe, Jr.
*Assistant Examiner* — Christopher Ballman
(74) *Attorney, Agent, or Firm* — Hershkovitz & Associates, PLLC; Abe Hershkovitz

(57) ABSTRACT

This invention relates to a flexible membrane separation valve, comprising a housing (120), the lateral surfaces of which are provided with slits (121), within which housing (120) a flexible membrane (122) with cylindrical symmetry is housed, within which an insert (130) having a body (131) with cylindrical symmetry is in turn housed, the insert (130) comprising a proximal end (132) having a proximal apex (133) spaced along the longitudinal axis of the insert (130) from a base (134) with cylindrical symmetry, through which the proximal end (132) joins to the body (131), the proximal apex (133) being joined to the base (134) through a continuous surface, the valve being characterized in that the proximal end (132) has an axial section such that tangent lines to the proximal apex (133) form an angle containing the longitudinal axis of the insert that is lower than or equal to 90°.

The invention further relates to an apparatus for mixing a liquid comprising such a flexible membrane separation valve.

19 Claims, 16 Drawing Sheets

(a)

(b)

(c)

(d)

(51) Int. Cl.
   *B01F 5/04*   (2006.01)
   *B01F 3/08*   (2006.01)

(56) References Cited

U.S. PATENT DOCUMENTS

| | | | | |
|---|---|---|---|---|
| 3,334,646 | A * | 8/1967 | Billeter | E03C 1/104 |
| | | | | 137/218 |
| 3,417,775 | A * | 12/1968 | Smith | F16K 24/06 |
| | | | | 137/218 |
| 3,797,515 | A * | 3/1974 | Buhler | F16K 24/06 |
| | | | | 137/218 |
| 4,582,081 | A * | 4/1986 | Fillman | F16K 15/145 |
| | | | | 137/218 |
| 4,726,390 | A * | 2/1988 | Franklin | E03C 1/104 |
| | | | | 137/218 |
| 5,507,436 | A * | 4/1996 | Ruttenberg | B05B 1/86 |
| | | | | 137/624.14 |
| 5,551,483 | A | 9/1996 | Hochstrasser | |
| 6,119,713 | A * | 9/2000 | Pino | E03D 3/06 |
| | | | | 137/218 |
| 6,554,018 | B1 * | 4/2003 | Pino | E03D 3/06 |
| | | | | 137/218 |
| 7,017,621 | B2 | 3/2006 | Beldham et al. | |
| 7,802,586 | B1 * | 9/2010 | Funari | E03D 3/00 |
| | | | | 137/217 |
| 2008/0223448 | A1 * | 9/2008 | Lohr | B01F 5/0413 |
| | | | | 137/217 |

FOREIGN PATENT DOCUMENTS

| | | |
|---|---|---|
| EP | 3713878 A1 | 11/1988 |
| EP | 0639675 | 2/1995 |

\* cited by examiner

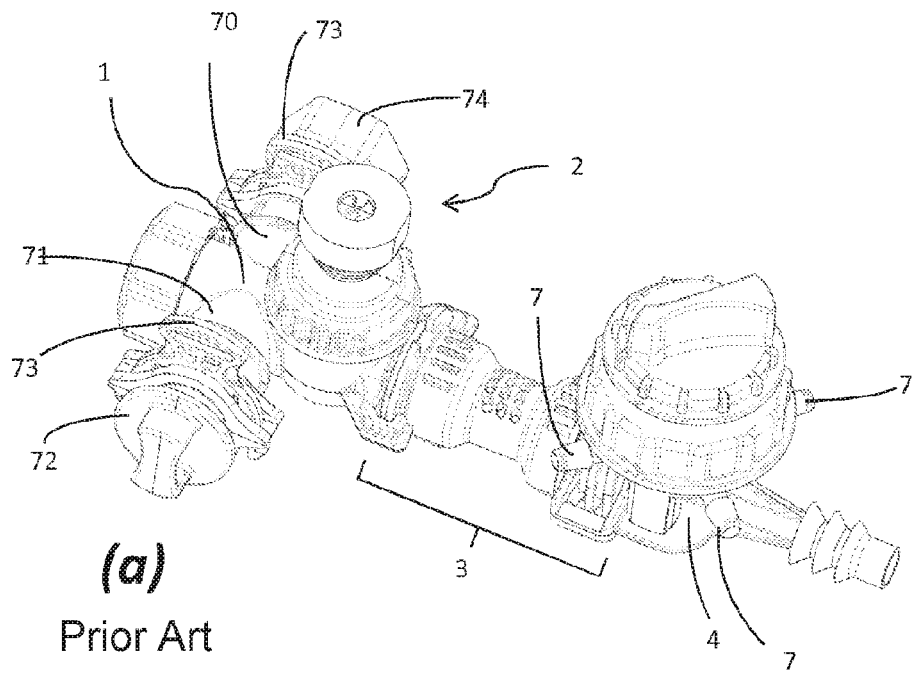
(a)
Prior Art
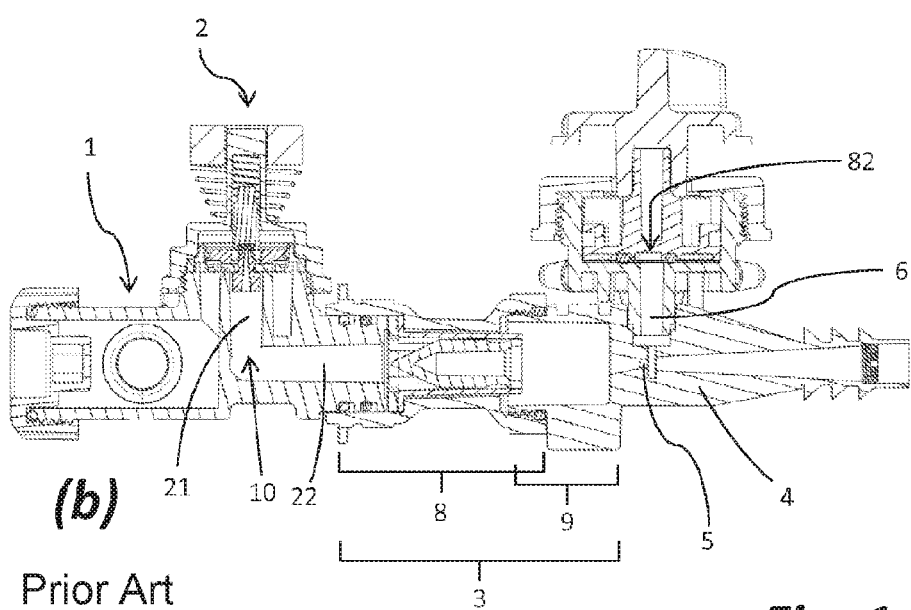
(b)
Prior Art
Fig. 1
Prior Art

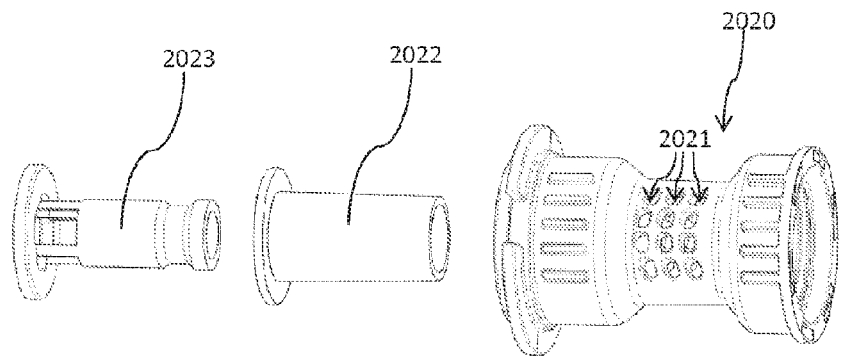
(a) Prior Art
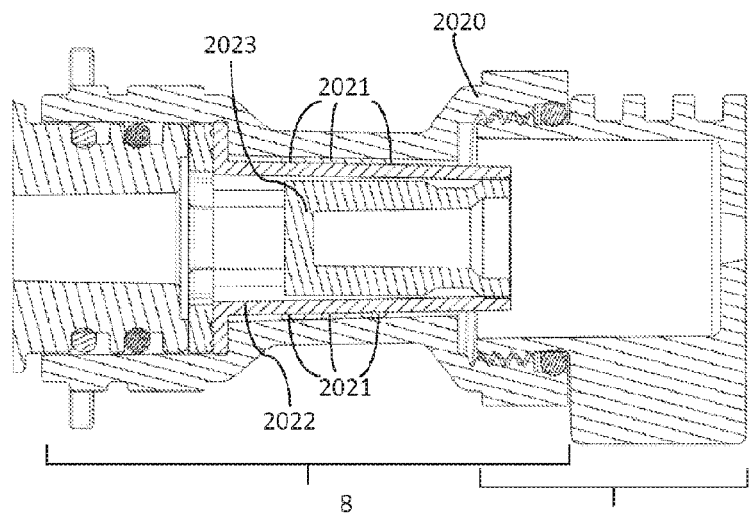
(b) Prior Art
Fig. 2
Prior Art

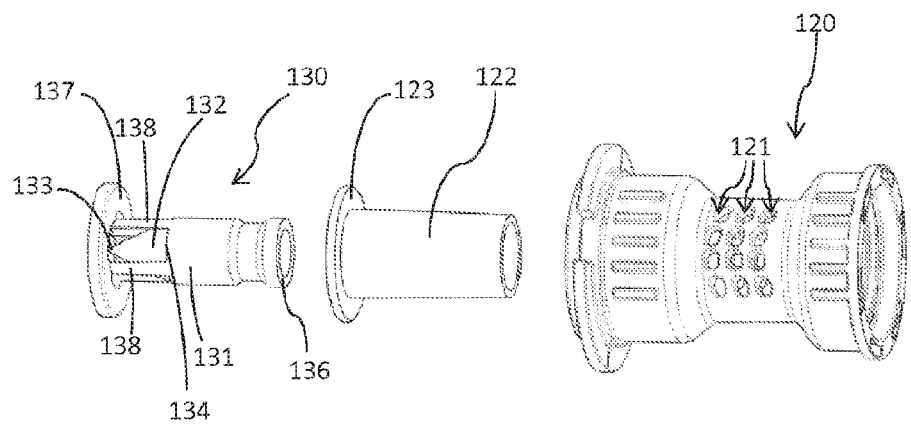
(a)
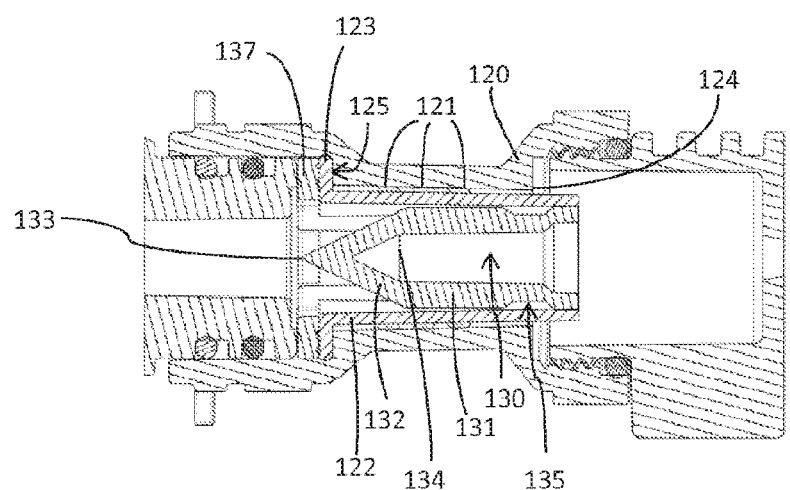
(b)
Fig. 3

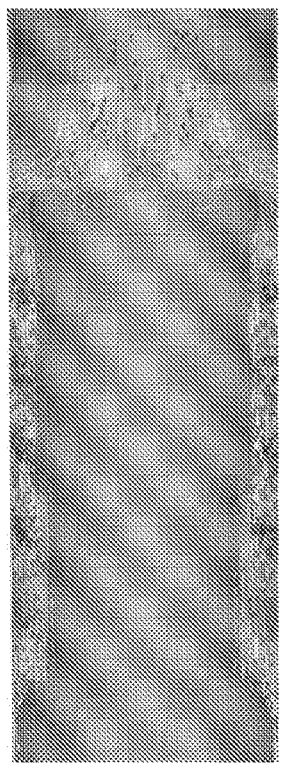 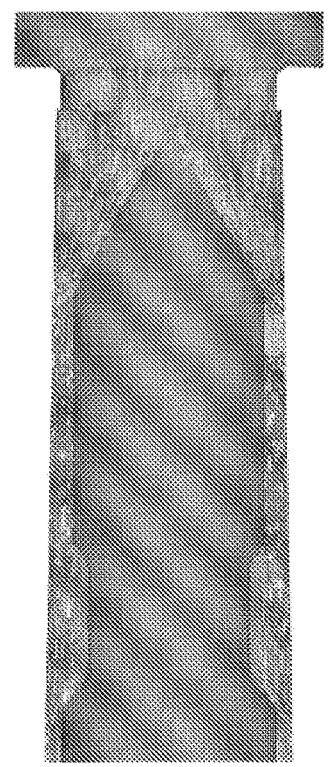
(a) (b)
Fig. 4

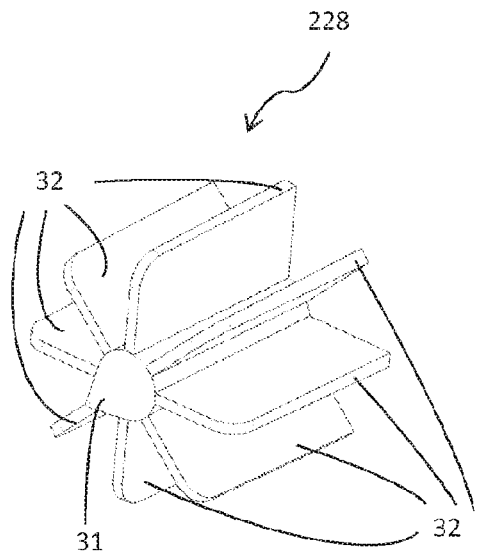
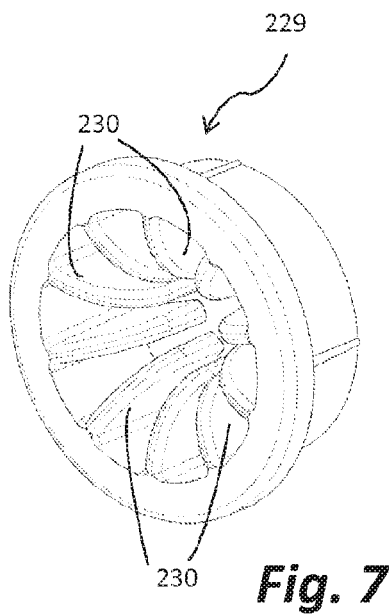
Fig. 6    Fig. 7
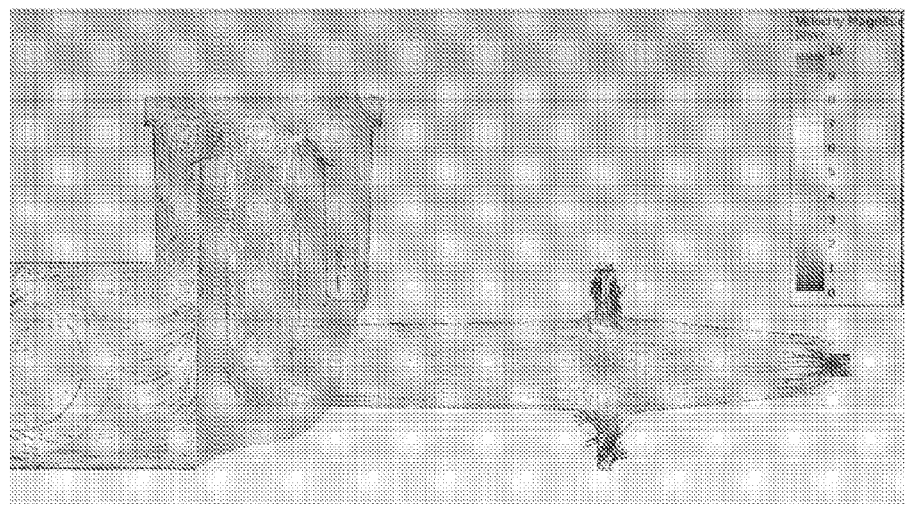
Fig. 8

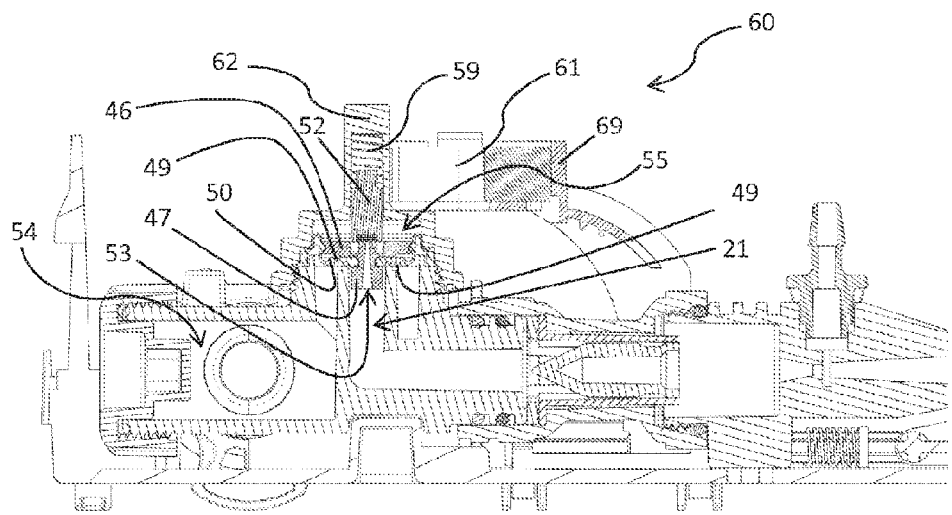
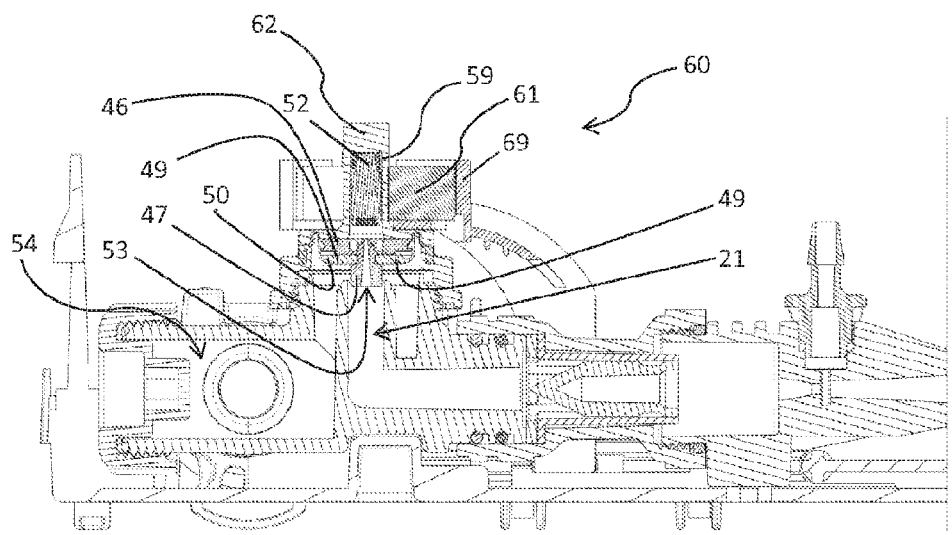
Fig. 14

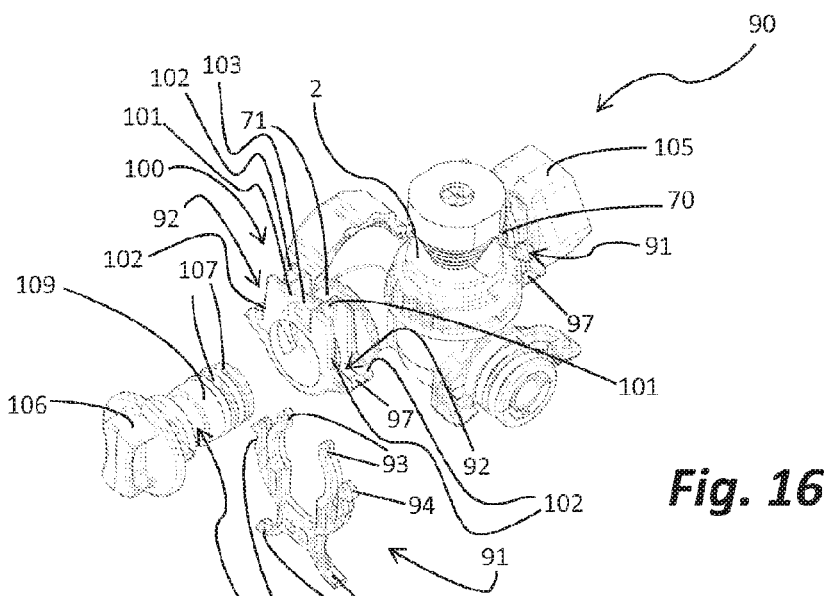
*Fig. 16*
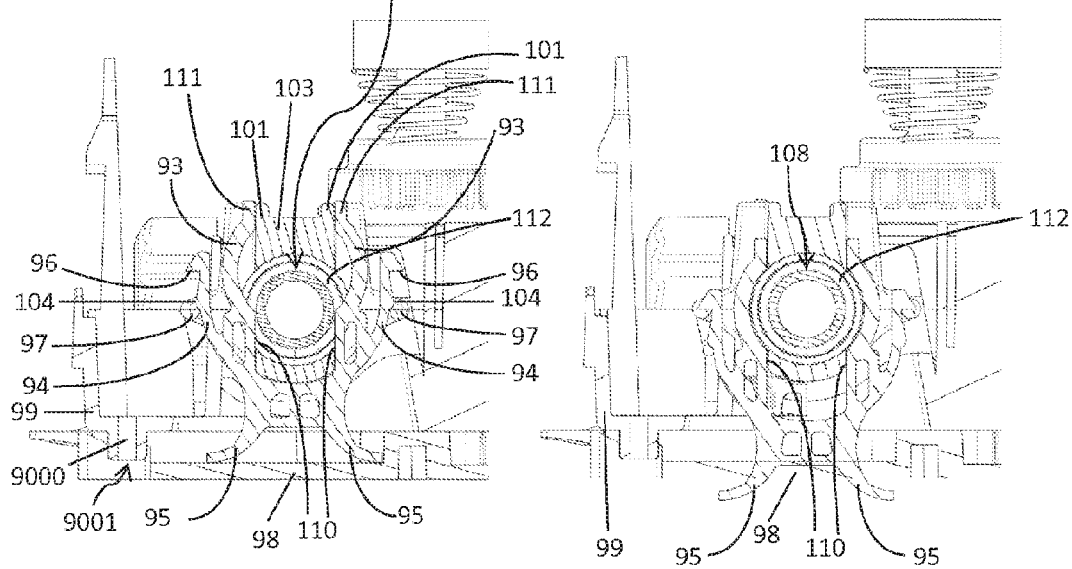
(a) *Fig. 17* (b)

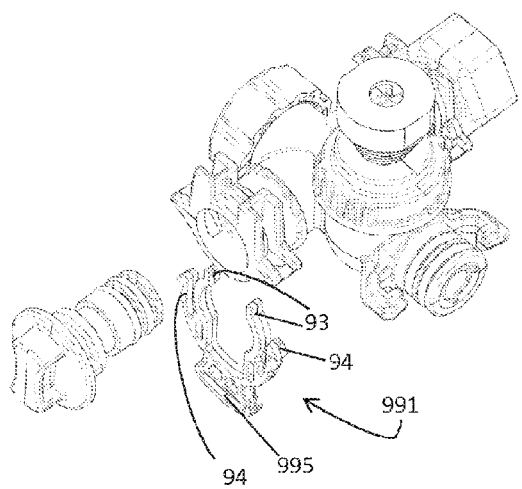
*Fig. 19*
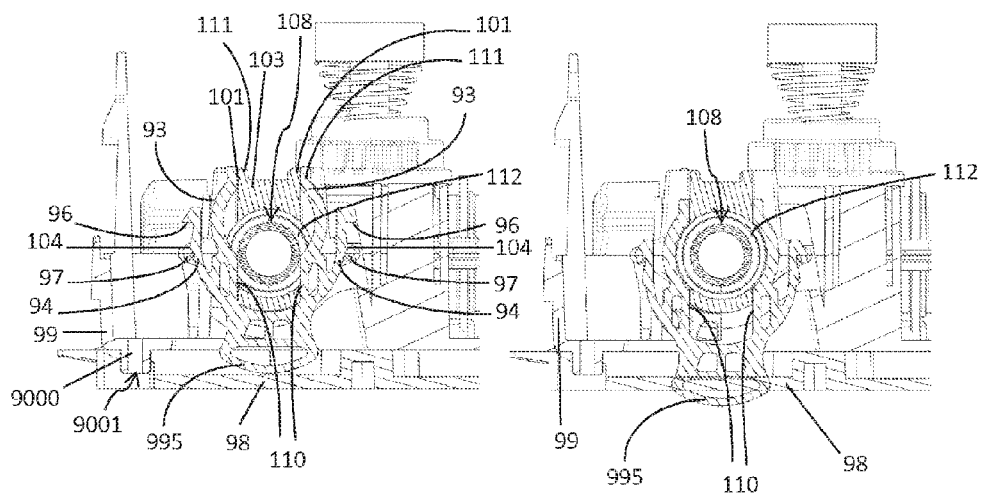
(a)     *Fig. 20*     (b)

FLEXIBLE MEMBRANE VALVE, IN PARTICULAR FOR BACKFLOW PREVENTION

CROSS-REFERENCE TO THE RELATED APPLICATIONS

This application is a U.S. National phase of International Application PCT/IB2012/053699, filed on Jul. 19, 2012, which claims priority from Italian application RM2011A000384, filed on Jul. 20, 2011. The entire contents of the International and Italian applications are incorporated herein by reference.

FIELD OF THE INVENTION

The present invention relates to a flexible membrane separation valve, in particular for backflow prevention, that allows in a reliable, versatile, efficient and inexpensive way to reduce the effects of the discontinuity of the flow of liquid, preferably water, ensuring a high tightness of the valve and permitting to increase the flow rate.

In the following of this description, reference will be mainly made to an application of the flexible membrane separation valve according to the invention to a mixing apparatus. However, it must be noted that the flexible membrane separation valve according to the invention may be applied to any apparatus, device, equipment, or system wherein it is necessary to make a disconnection or separation of two portions of a hydraulic circuit, still remaining within the scope of protection of the present invention.

BACKGROUND OF THE INVENTION

It is known that mixing apparatuses are widespread. In particular, in the field of cleaning and disinfection of surfaces, such apparatuses allow both treatment exclusively with water and adding of concentrated chemical products, such as for instance disinfectants, soaps, wet foams and dry foams. The apparatus described in document U.S. Pat. No. 7,017,621 B2 and the apparatus called KP1H available from the US company Knight are two examples of such mixing apparatuses.

With reference to FIG. 1, it may be observed that the hydraulic circuit of such apparatuses draws the water from the supply through a hydraulic cross connection 1, capable to operate with water pressure values up to 10 bars (i.e. $10^6$ Pascals), controlled by a magnetically actuated valve 2. The hydraulic cross connection 1, the housing case (not shown in FIG. 1) of which is mounted on the wall (directly or through a bracket) so that the magnetically actuated valve 2 is frontally accessible by an operator, comprises an inlet duct 70 upstream of the valve 2, for connecting to the supply through a connector 74, and an outlet duct 71 allowing the connection to a hydraulic cross connection of another mixing apparatus (or to any other duct) connected downstream of that shown in FIG. 1 through a similar connector (not shown in FIG. 1). In the case where the outlet duct 71 is not connected to any downstream hydraulic cross connection (or any other duct), it is closed through a stopper 72. The connector 74 and the stopper 72 are attached to the inlet duct 70 and outlet duct 71, respectively, through corresponding quick coupling removable hooks 73 frontally applied (i.e. from the same side of the magnetically actuated valve 2) by an operator.

The hydraulic cross connection 1, downstream of the magnetically actuated valve 2, comprises an elbow 10 (formed by an upstream duct 21 and a downstream duct 22) downstream of which an assembly 3 of separation valves is present, for preventing the backflow towards the chemical products supply, and, downstream of these, a mixing device 4 based on the Venturi effect, that mixes the water with the chemical product. In particular, the mixing device 4 comprises a small tube 5 wherein, upon the passage of water, a low pressure and hence an aspiration of the chemical product from an aspiration tube 6 (connected to an external tank through a mouth 82) and its dilution in water are generated. Dosage depends on the flow rate and water pressure, and it is possible to manage the dilution through proper nozzles 7 which are inserted into external tubes (not shown) for aspirating the chemical product and which adjust the percentage thereof. Such apparatuses are completely automatic and, since they are constituted only by a hydraulic system, they do not need any power supply.

The presence of the assembly 3 of separation valves is necessary because the chemical product tank are connected to the water supply of drinking water, and backflow prevention of the chemical products towards the supply must be hence guaranteed, e.g. in the case where a temporary low pressure occurs in the supply. Some prior art separation valves are described, e.g., by documents EP 1 522 353 A1, U.S. Pat. No. 6,478,047 and U.S. Pat. No. 6,021,805.

The regulations of many countries require the presence of separation valves for guaranteeing the non-contamination of the supplies with the chemical products. In Europe, the types of valves are described by DIN EN 1717 regulation, and the separation valve assemblies generally comprise, as for the apparatus shown in FIG. 1, two cascaded valves: a flexible membrane separation valve 8, and an air gap valve 9 (wherein the flow of the liquid coming from the supply carries out a physical jump for entering the circuit comprising the mixing device 4). Examples of such two valves are the Flex-Gap™ and Aire-Gap™ valves available from the US company Knight.

With reference to FIG. 2, it may be observed that the flexible membrane separation valve comprises a housing 2020 with cylindrical symmetry, the lateral surfaces of which are provided with slits 2021, within which housing 2020 a hollow flexible membrane 2022 with cylindrical symmetry is housed, within which an insert 2023 with substantially cylindrical symmetry is in turn housed. The slits 2021 of the housing 2020 make the valve operate as an open system in air, preventing the mixed liquid from possibly rising back and contaminating the supply in case of a low pressure in the same supply. When the water flows in the mixing apparatus from the supply to the mixing device 4, it passes between the insert 2023 and the flexible membrane 2022, causing the latter to widen due to the pressure thus closing the passages of the slits 2021 of the housing 2020 outwards, modifying the operation of the valve that thus operates as a closed system. In this regard, it must be considered that some features of the flexible membrane separation valve only shown in FIGS. 1 and 2 and not described are actually not known in the prior art, as far as the inventors are aware, rather they are part of the flexible membrane separation valve according to the invention. He features which, though shown in FIGS. 1 and 2, are not known in the prior art will be expressly mentioned later with reference to FIG. 3.

However, the flexible membrane separation valves of the prior art suffer from some drawbacks, mainly due to the fact that they introduce a significant discontinuity in the flow of the water (e.g. in case of a mixing apparatus, from the water supply to the mixing device 4). First of all, the valve tightness is not perfect, most of all when the water starts to flow or at low operation pressures. Moreover, the effective flow rate of the valve is lower than its nominal value. Finally, in case of a mixing apparatus, the subsequent mixing device 4 has significant priming problems most of all at low operation pressures. Also, in the case where a plurality of chemical products can be mixed, there is the risk that the latter get in contact with each other before being diluted in water.

BRIEF SUMMARY OF THE INVENTION

It is an object of this invention, therefore, to allow in a reliable, versatile, efficient and inexpensive way to reduce the effects of the discontinuity of the flow of liquid in a flexible membrane separation valve, ensuring a high tightness of the valve and permitting to increase the flow rate under all the operating conditions.

It is a further object of this invention to regularise the flow of liquid in the air gap disconnection of a mixing apparatus, drastically reducing the need for maintenance and ensuring a correct mixing under all the operating conditions. It is another object of this invention to activate the venturi mixing device under all the operating conditions, ensuring a correct mixing and permitting to increase the flow rate of the mixing device. It is still a further object of this invention to allow in a manner that is simpler, reliable, efficient, inexpensive, and safe for the operators to activate the magnetically actuated valve. It is still another object of this invention to allow in a manner that is reliable, efficient, inexpensive, fast and safe for the operators to attach stoppers and/or connectors to the hydraulic cross connection.

It is specific subject-matter of the present invention a flexible membrane separation valve, comprising a housing, the lateral surfaces of which are provided with slits, within which housing a hollow flexible membrane with cylindrical symmetry is housed, within which an insert having a body with cylindrical symmetry is in turn housed, the insert comprising a proximal end having a proximal apex spaced along the longitudinal axis of the insert from a base with cylindrical symmetry, through which the proximal end joins to the body, the proximal apex being joined to the base through a continuous surface, the valve being characterised in that the proximal end has an axial section such that tangent lines to the proximal apex form an angle containing the longitudinal axis of the insert that is lower than or equal to 90°.

Also according to the invention, the insert may be provided with a side notch in a longitudinal position corresponding to a distal internal edge of the housing.

Still according to the invention, the insert may comprise a distal circular base having a diameter D2 larger than a diameter D1 of the body of the same insert by an amount ranging from 3% to 15%, whereby:

$$1.03 \cdot D1 \leq D2 \leq 1.15 \cdot D1.$$

Also according to the invention, the continuous surface of the insert, through which the proximal apex is joined to the base, may be an ogival surface.

Still according to the invention, the continuous surface of the insert, through which the proximal apex is joined to the base, may be a conical surface.

Furthermore according to the invention, the continuous surface of the insert, through which the proximal apex is joined to the base, may be a surface with axial symmetry.

Also according to the invention, the proximal apex of the insert may be misaligned with respect to a longitudinal axis of the body of the insert.

It is further specific subject-matter of the present invention an apparatus for mixing a liquid, preferably water, drawn from a supply with one or more concentrated chemical products, comprising a mixing device downstream of a separation valve, characterised in that said separation valve is a flexible membrane separation valve as previously described.

Further embodiments of the mixing apparatus according to the invention are defined in the dependent claims of the application.

The insert used in the flexible membrane separation valve according to the invention is shaped so as to regularise the flow of liquid, preferably water, passing through the valve, i.e. drastically reducing its discontinuity, overcoming all the aforementioned problems with reference to the flexible membrane separation valves of the prior art.

This allows to increase the valve performance, decreasing the pressure drops and favouring the flooding of the flexible membrane.

The mixing apparatus comprising the flexible membrane separation valve according to the invention allows to reach all the aforementioned objects.

BRIEF DESCRIPTIONS OF THE DRAWINGS

The present invention will be now described, by way of illustration and not by way of limitation, according to its preferred embodiments, by particularly referring to the Figures of the annexed drawings, in which:

FIG. 1 schematically shows a perspective view (FIG. 1a) and a longitudinal cross-section view (FIG. 1b) of the hydraulic circuit of a mixing apparatus according to the prior art;

FIG. 2 schematically shows an exploded perspective view (FIG. 2a) and a longitudinal cross-section view (FIG. 2b) of a flexible membrane separation valve of the hydraulic circuit of FIG. 1;

FIG. 3 schematically shows an exploded perspective view (FIG. 3a) and a longitudinal cross-section view (FIG. 3b) of a preferred embodiment of the flexible membrane separation valve according to the invention and two variants (FIG. 3c; FIG. 3d) of the insert of the same flexible membrane separation valve;

FIG. 4 schematically shows the graphic results of fluid dynamic simulations of the valve of FIG. 2 (FIG. 4a) and of the valve of FIGS. 3a and 3b (FIG. 4b);

FIG. 5 schematically shows a longitudinal cross-section view of a second embodiment of the mixing apparatus according to the invention;

FIG. 6 shows a perspective view of a first component of the mixing apparatus of FIG. 5;

FIG. 7 shows a perspective view of a second component of the mixing apparatus of FIG. 5;

Figure 5:
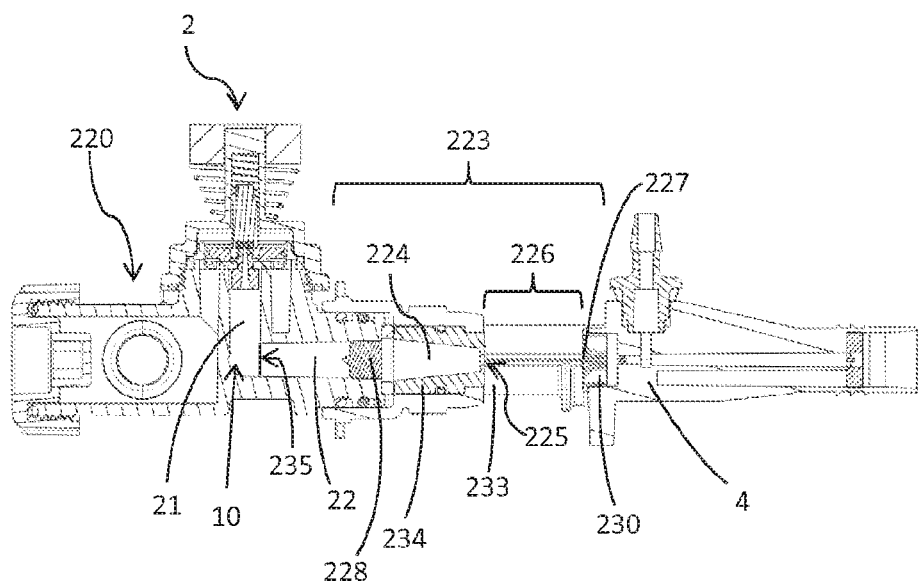
Figure 9:
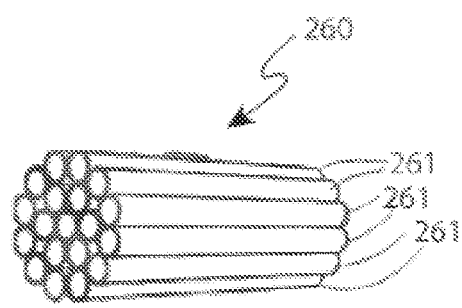
Figure 10:
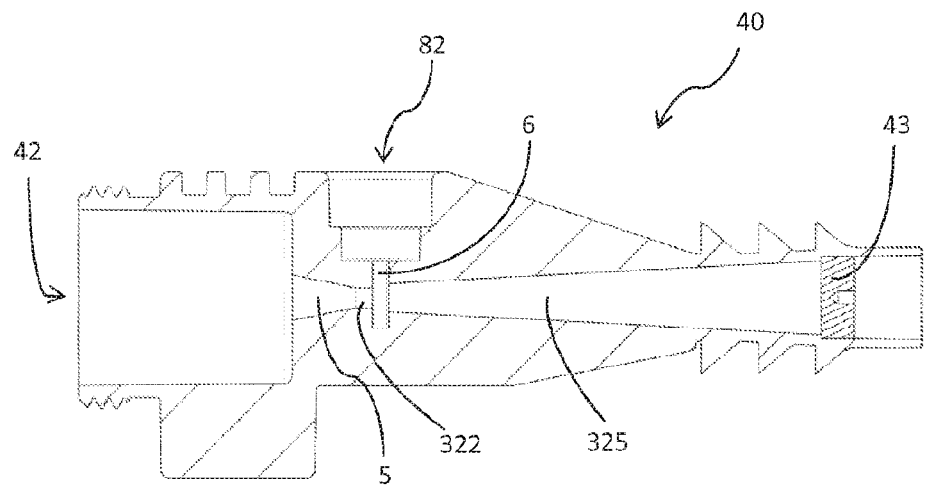
Figure 11:
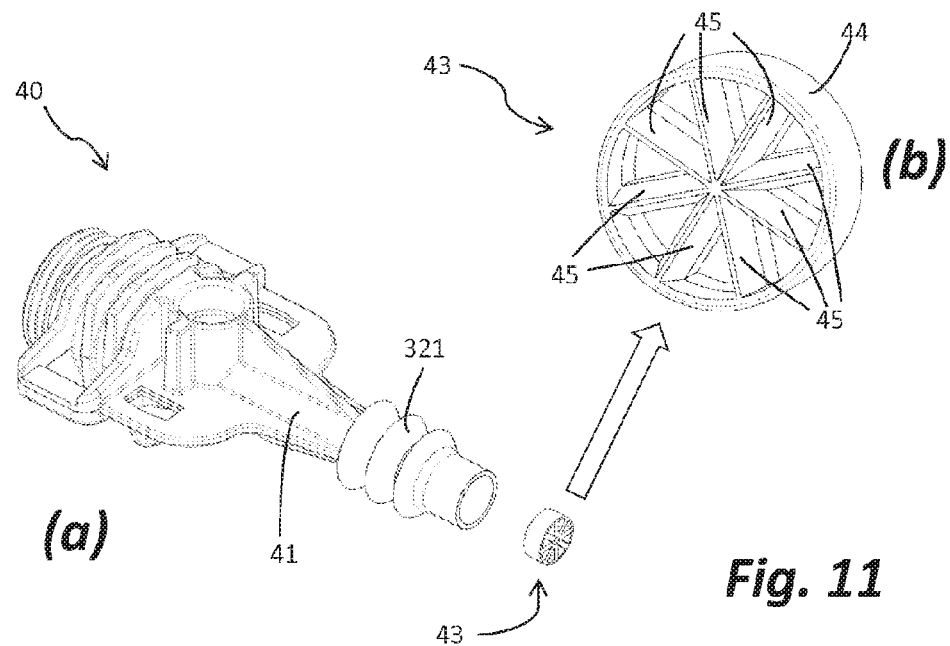
Figure 12:
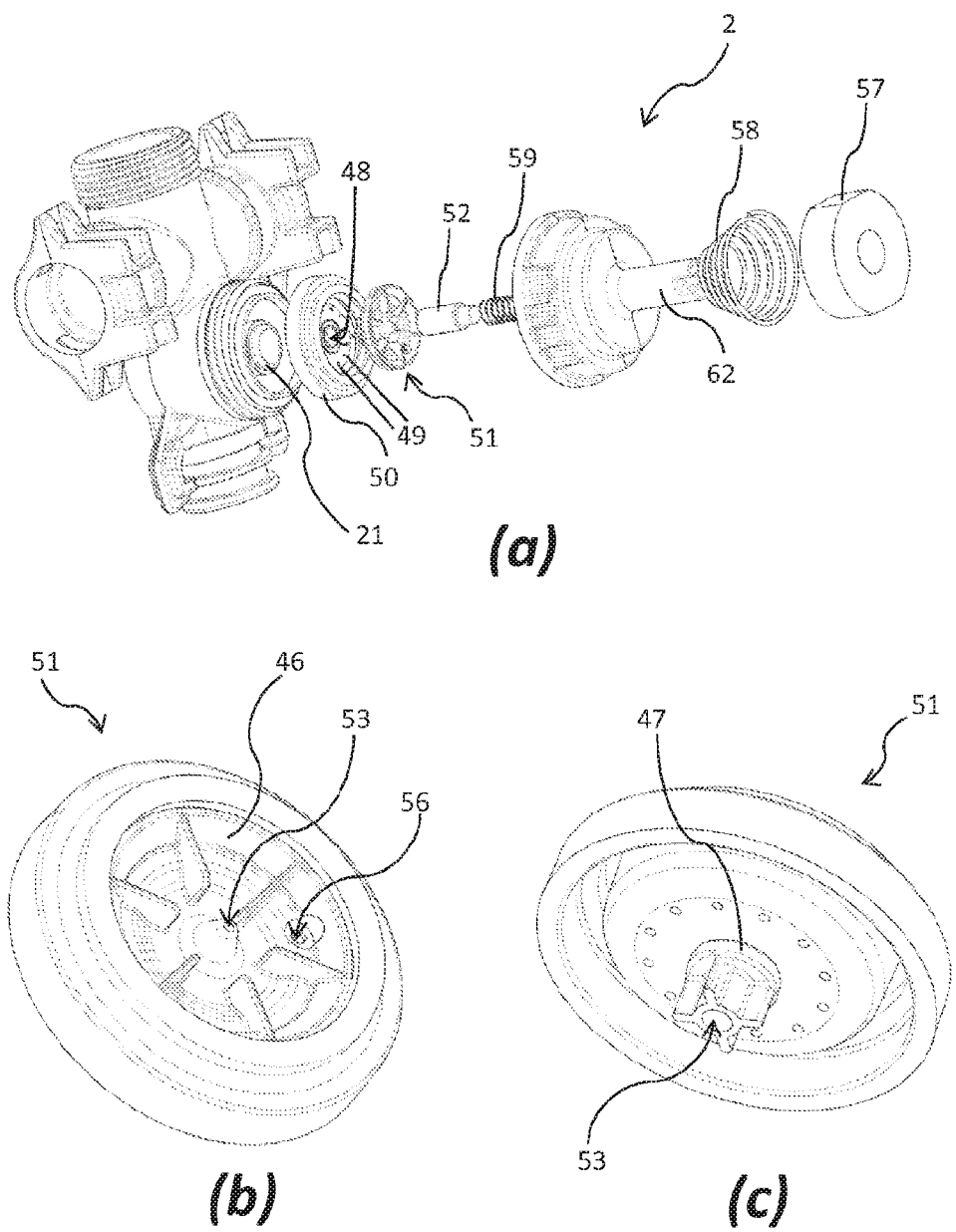
Figure 13:
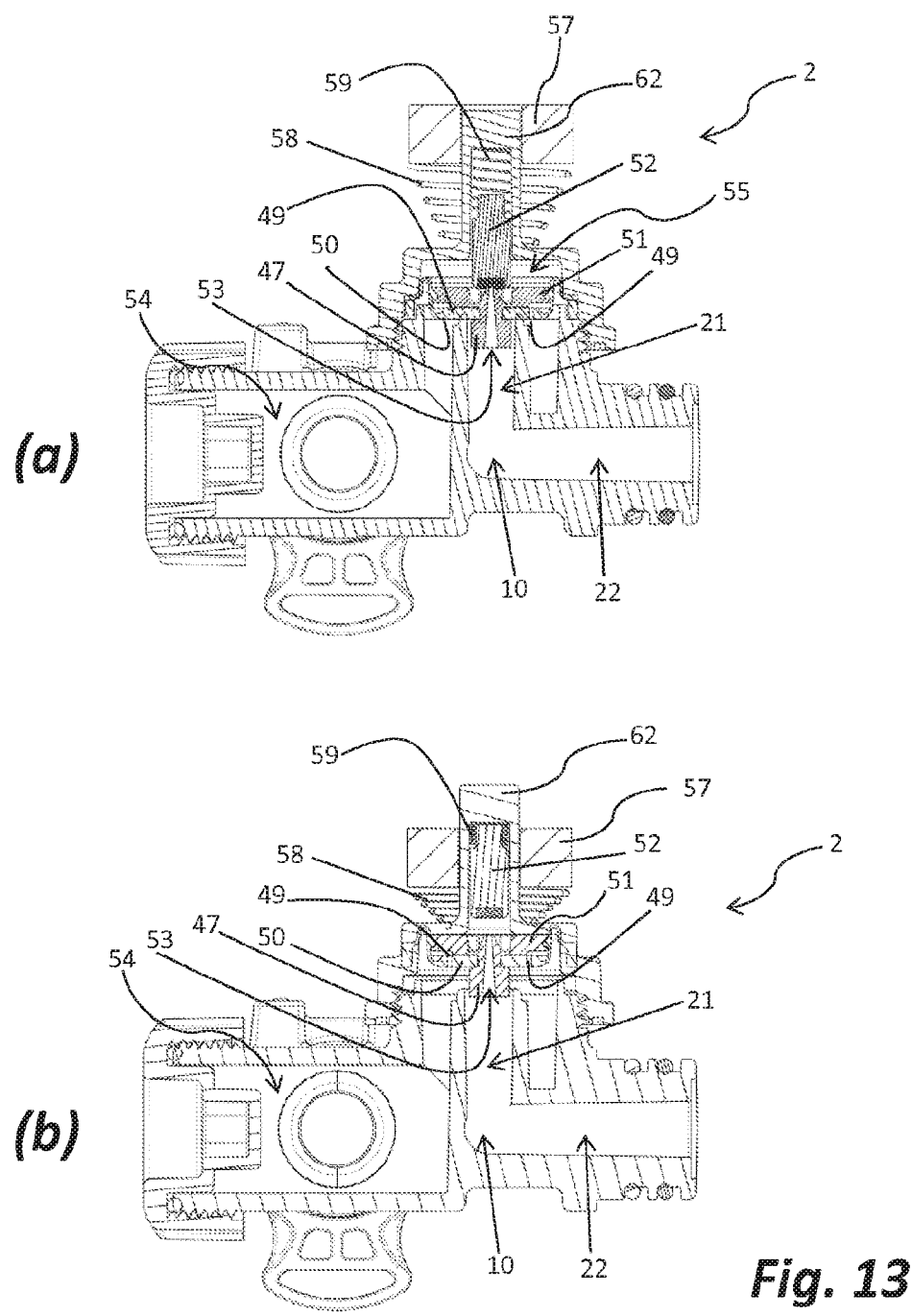
Figure 15:
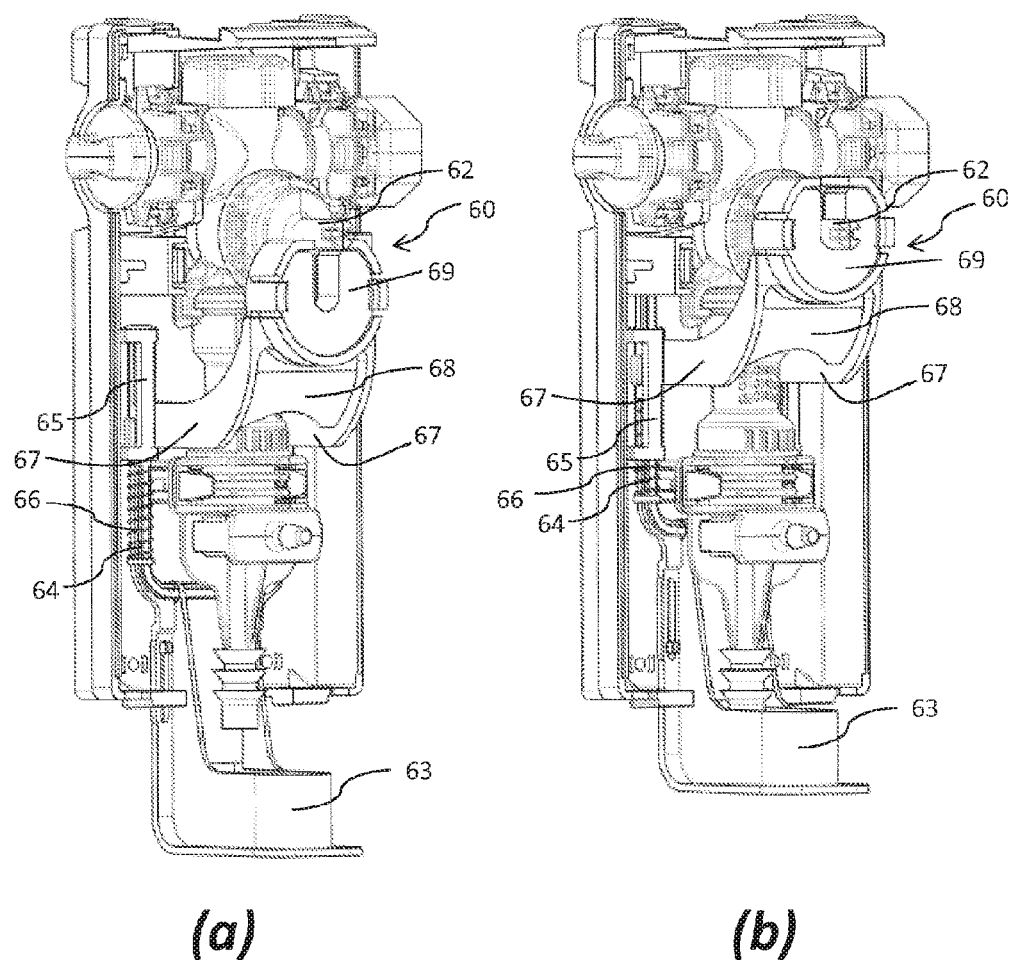
Figure 18:
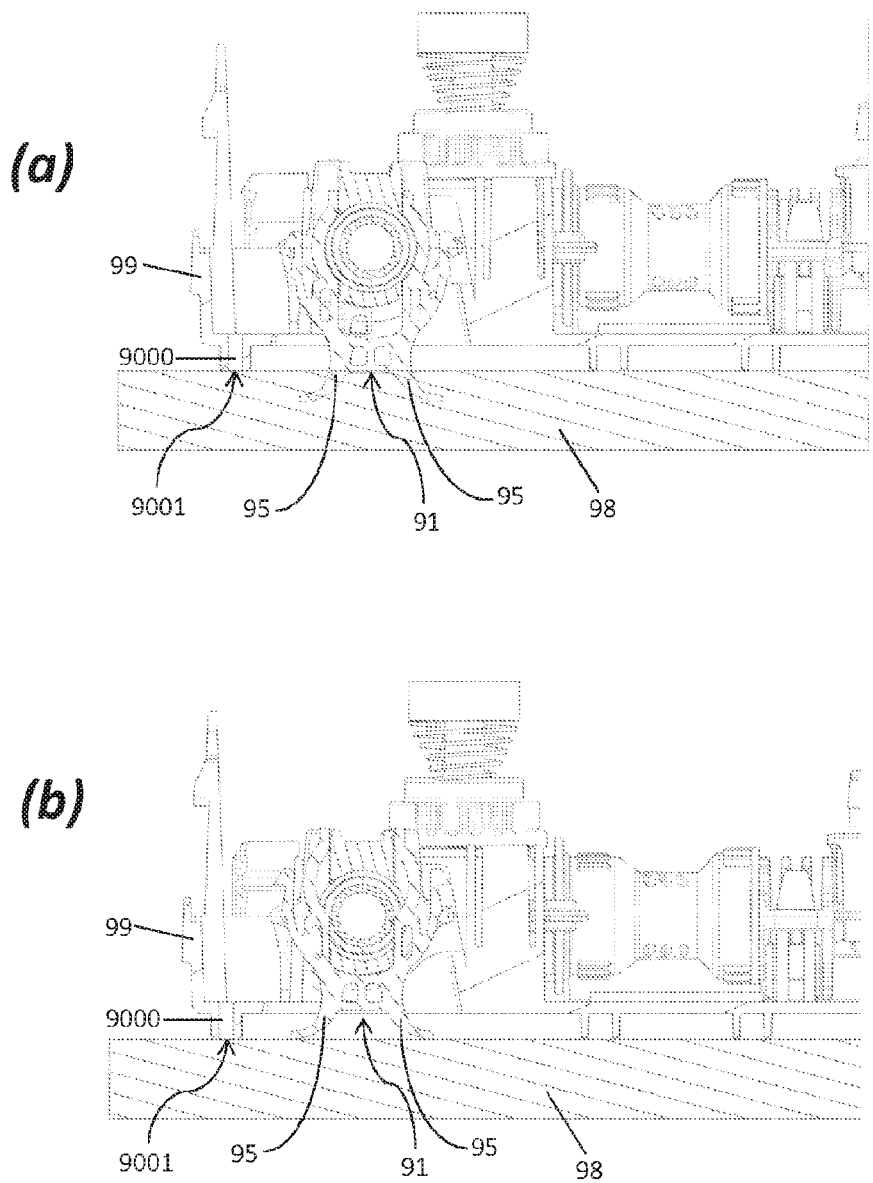

FIG. 8 schematically shows the graphic results of fluid dynamic simulations of the mixing apparatus of FIG. 5;

FIG. 9 shows a perspective view of the first component, different from that shown in FIG. 6, of a further embodiment of the mixing apparatus according to the invention;

FIG. 10 schematically shows a longitudinal cross-section view of a third embodiment of the mixing apparatus according to the invention;

FIG. 11 shows an exploded perspective view (FIG. 11a) and a perspective view (FIG. 11b) of an enlarged first component of the apparatus of FIG. 10;

FIG. 12 schematically shows an exploded perspective view (FIG. 12a) of the magnetically actuated valve of the mixing apparatus of FIG. 5, and a top perspective view (FIG. 12b) and a bottom perspective view (FIG. 12c) of a membrane-insert assembly of such magnetically actuated valve;

FIG. 13 schematically shows a longitudinal cross-section of a portion of the mixing apparatus of FIG. 5 comprising the magnetically actuated valve of FIG. 12 in a closed configuration (FIG. 13a) and in an open configuration (FIG. 13b);

FIG. 14 schematically shows a longitudinal cross-section of a portion of a fourth embodiment of the mixing apparatus according to the invention comprising a different magnetically actuated valve in a closed configuration (FIG. 14a) and in an open configuration (FIG. 14b);

FIG. 15 schematically shows a perspective view of the mixing apparatus of FIG. 14 in the closed configuration (FIG. 15a) and in the open configuration (FIG. 15b);

FIG. 16 schematically shows a perspective view of the hydraulic cross connection of a fifth embodiment of the mixing apparatus according to the invention;

FIG. 17 schematically shows a longitudinal cross-section of a portion of the hydraulic cross connection of FIG. 16 in an attachment configuration (FIG. 17a) and in an open configuration (FIG. 17b);

FIG. 18 schematically shows a longitudinal cross-section of a portion of a sixth embodiment of the mixing apparatus according to the invention in an open configuration (FIG. 18a) and in an attachment configuration (FIG. 18b);

FIG. 19 schematically shows a perspective view of a further embodiment of the hydraulic cross connection according to the invention; and FIG. 20 schematically shows a longitudinal cross-section of a portion of the hydraulic cross connection of FIG. 19 in an attachment configuration (FIG. 20a) and in an open configuration (FIG. 20b).

Figure 21:
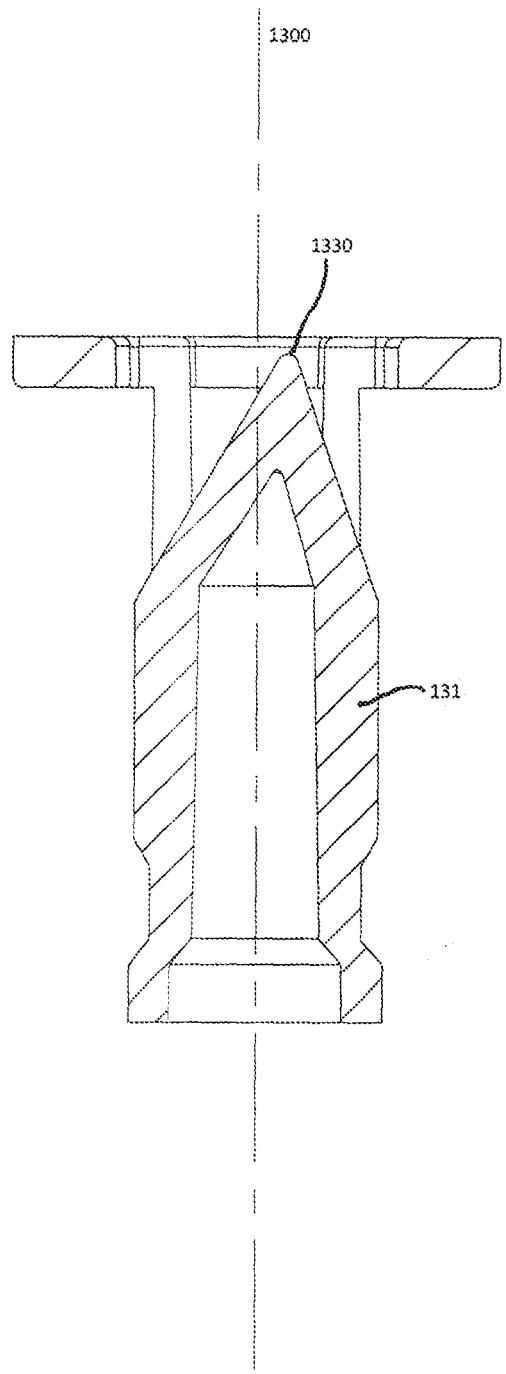

FIG. 21 schematically shows the feature of the proximal apex being misaligned with respect to a longitudinal axis of the body of the insert. In the Figures identical reference numerals will be used for alike elements.

DETAILED DESCRIPTION OF THE INVENTION

Figure 3:
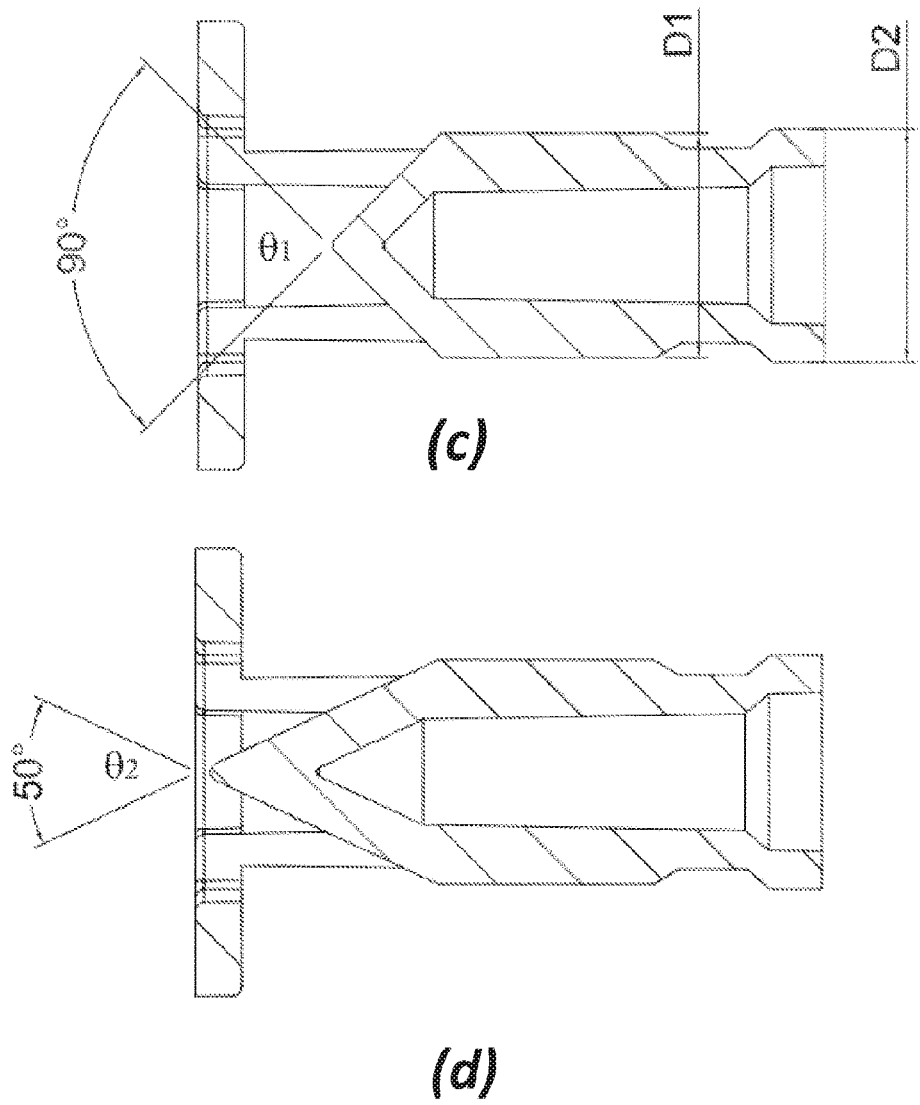

With reference to FIG. 3, it may be observed that a preferred embodiment of the flexible membrane separation valve according to the invention comprises, similarly to the prior art valve shown in FIG. 2, a housing 120 with substantially cylindrical symmetry, the lateral surfaces of which are provided with slits 121, within which housing 120 a hollow flexible membrane 122 with substantially cylindrical symmetry is housed, within which an insert 130 is in turn housed. The membrane 122 is provided with a proximal ring 123 orthogonal to a longitudinal axis of the membrane 122, it has preferably constant thickness, and it is still more preferably made of silicone. Obviously, in the context of the present description and claims, it is meant with "proximal" element and "distal" element respectively an element located or orientated upstream and an element located or orientated downstream along the flow of the water flowing through the flexible membrane separation valve (with reference to FIG. 1b, such flow goes from the duct 21 to the outlet of the mixing device 4). In other words, the term "proximal" may be deemed as meaning "upstream" and the term "distal" may be deemed as meaning "downstream". The operation modes of the valve of FIG. 3 are similar to those of the valve of FIG. 2; however, the innovative geometry of the insert 130 allows the valve of FIG. 3 to have much better performance.

In fact, the insert 130 is shaped so as to comprise a body 131 with substantially cylindrical symmetry and a proximal conical end 132 (preferably according to a right circular cone), with the apex 133 in proximal position (i.e. orientated towards the valve inlet). A proximal ring 137, integrally coupled to the body 131 through substantially linear supports 138 connected to the side wall of the body 131, projects from the body 131 in proximal direction. Moreover, the insert 130 is provided with a side notch 135 in a longitudinal position in proximity of the distal circular base 136 of the insert body 131 so that, when the flexible membrane separation valve according to the invention is assembled as shown in FIG. 3b (whereby the insert 130 is housed within the membrane 122 in turn housed within the housing 120), the side notch 135 is in correspondence with a distal internal seal edge 124 of the housing 120. Although shown in FIGS. 1 and 2, the side notch 135 and the distal internal edge 124 of the housing 120, as well as their mutual arrangement, are not known in the prior art as far as the inventors are aware.

The shape of the proximal end 132 of the insert 130, joining to the body 131 with substantially cylindrical symmetry in correspondence with a base 134 with cylindrical symmetry of the proximal end 132, allows to regularise the flow of liquid, preferably water, passing through the valve. In fact, the inlet conical surface separates the water uniformly thrusting the same on the whole diameter of the valve passage interposed between the external surface of the body 131 of the insert 130 and the internal surface of the flexible membrane 122, increasing the valve performance, decreasing the pressure drops and favouring the flooding of the flexible membrane 122. To this end, the aperture $\theta$ of the proximal conical end 132 (i.e. the cone apex angle) is lower than or equal to 90°, more preferably lower than or equal to 50'; by way of example and not by way of limitation, FIGS. 3c and 3b show two variants of the insert 130 wherein the aperture $\theta$ of the proximal conical end 132 is respectively equal to $\theta_1=90°$ and $\theta_2=50°$.

Moreover, the mutual arrangement of the side notch 135 of the insert 130 and of the distal internal edge 124 of the housing 120 also contributes to the efficient regularisation of the flow; in fact, the side notch 135 causes the flow thrust to increase just in correspondence with the distal internal edge 124 on which the flow is concentrated, so as to press the flexible membrane 122 on the same edge ensuring the valve tightness, and further changing the angle at which the flow exits from the flexible membrane separation valve so as to widen the same flow, so as to fill the duct of the subsequent air gap valve with a high velocity. In particular, the tightness of the flexible membrane at its proximal end is ensured by keeping the proximal ring 123 of the membrane 122 between the proximal ring 137 of the insert 130 and a corresponding proximal internal stop 125 of the housing 120.

Such flow regularisation effect is further improved by the fact that, as shown in greater detail in FIG. 3c, the diameter D2 of the distal base 136 of the insert 130 is larger than the diameter D1 of the body 131 of the same insert by an amount ranging from 3% to 15%, whereby:

$$1.03 \cdot D1 \leq D2 \leq 1.15 \cdot D1.$$

Such difference between the diameter D2 of the base distal 136 of the insert 130 and the diameter D1 of the body 131 of the same insert is not known in the prior art as far as the inventors are aware.

The particularly efficient flow regularisation carried out by the valve of FIGS. 3a and 3b with respect to the prior art valve of FIG. 2 is evident from the fluid dynamic simulations shown in FIG. 4.

Other embodiments of the flexible membrane separation valve according to the invention may have insert shapes different from the one of the insert 130 of FIG. 3.

By way of example, the lateral surface of the proximal end may be, instead of conical, an ogival surface, so as to offer a low fluid dynamic resistance. Purely by way of example, and not by way of limitation, the insert proximal end may have a symmetric curvilinear axial section (instead of triangular as in the case of the insert 130 of FIG. 3); in such case, the tangent lines to the apex of the axial section preferably form an angle (containing the insert longitudinal axis) lower than or equal to 90°.

Other embodiments of the valve according to the invention may also include an insert having the proximal end the axial section of which is not symmetric, e.g. as shown in FIG. 21, wherein the apex 1330 is misaligned with respect to the longitudinal axis 1300 of the insert body 131 with cylindrical symmetry. In general terms, the shape of the proximal end 132 comprises a proximal apex 133 (or 1330) spaced along the longitudinal axis of the insert 130 (or 1300) from a base 134 with cylindrical symmetry, joined to the insert body 131 with cylindrical symmetry, wherein the (possibly misaligned) apex 133 (or 1330) is joined to the base 134 through a continuous surface, e.g. a conical or ogival one, i.e. the cross-section of which has a continuous profile, e.g. a triangular or more generally curvilinear one.

With reference to FIG. 5, it may be observed that a second embodiment of the mixing apparatus with air gap disconnection comprises a hydraulic cross connection 220 controlled by a magnetically actuated valve 2. Downstream of the magnetically actuated valve 2, the hydraulic cross connection 220 comprises an elbow 10 formed by an upstream duct 21 and a downstream duct 22, the latter having a diameter D; by way of example, and not by way of limitation, the diameter D of the downstream duct 22 may be equal to 8 mm. The downstream duct 22 is connected to an air gap valve 223 comprising a nozzle 224 the outlet of which, indicated with the reference numeral 225, is spaced apart by a separation distance 226, obtained within a distal portion 233 of the valve 223, from a collecting duct 227. The latter constitutes the inlet of the subsequent venturi mixing device 4 (alternatively, the collecting duct 227 could belong to the valve 223 and be connected to the mixing device 4). In particular, the nozzle 224 is housed in a proximal portion 234 of the valve 223 coupled to the distal portion 233 through a male-female connection wherein the proximal portion 234 is provided with the male connector and the distal portion 233 is provided with the corresponding female connector. The length L of the linear channel going from the inlet mouth 235 of the downstream duct 22 (coinciding with the outlet mouth of the elbow 10) to the outlet 225 of the nozzle 224 of the valve 223 is not lower than the diameter D of the downstream duct 22 and not larger than 20D (i.e. $D \leq L \leq 20D$); this allows the fluid to uniform the velocities in the section while it proceeds along the channel from the elbow 10 to the outlet 225 of the nozzle 224, reducing the turbulences of the fluid exiting from the nozzle 224. In order to reduce the length L, achieving in any case a proper uniformity of the fluid velocities so as to straighten the turbulent vectors and to definitively transform the fluid motion into a laminar one at the nozzle outlet 225, the downstream duct 22 is provided, preferably in correspondence with the connection to the valve 223 (i.e. in correspondence with the distal end of the downstream duct 22), with a flow straightener 228 (also called fluid thread straightener). Also the specific configuration of the male-female connection between the proximal portion 234 and the distal portion 233 of the valve 223 contributes, though not in an essential manner, to the fluid velocity uniformity, since it regularises the section of the valve 223.

As shown in FIG. 6, the flow straightener 228, having a shape with cylindrical symmetry capable to be housed within the downstream duct 22, preferably has a proximal end 31 (i.e. that points at a direction opposite to the fluid flow) shaped as an ogive and a plurality of angularly equally spaced coaxial longitudinal tongues 32. In particular, in the mixing apparatus with air gap disconnection of FIG. 5, the proximal end 31 of the flow straightener 228 is located at a distance equal to 4,31D from the inlet mouth 235 of the downstream duct 22.

As shown in FIG. 7, the collecting duct 227 is integrated in a substantially cylindrical splash-guard device 229 internally provided with longitudinal tongues 230 shaped according to a fluid dynamic profile. Preferably, each longitudinal tongue 230 is shaped so that its edge has a varying distance from the cylindrical wall of the splash-guard device 229 that is not decreasing from the inlet end to the outlet end of the splash-guard device 229 according to a curvilinear profile that preferably starts, at the proximal end, from the cylindrical wall of the splash-guard device 229.

The fluid dynamic simulations represented in FIG. 8 (made with reference to the mixing apparatus of FIG. 5 without the flow straightener 228) show that the mixing apparatus with air gap disconnection of FIG. 5 allows to achieve a proper fluid velocity uniformity, so as to straighten the turbulent vectors created by the elbow 10, and to definitively transform the fluid motion into a laminar one at the outlet 225 of the nozzle 224. Since the fluid arrives at the outlet 225 of the nozzle 224 with a laminar motion, the produced jet crossing the distance 226 is compact and devoid of turbulences. This allows to avoid the use of small nets, as it happens for the prior art mixing apparatuses.

Other embodiments of the mixing apparatus with air gap disconnection according to the invention may have a length L of the linear channel preceding the outlet 225 of the nozzle 224 of the air gap valve 223, in particular, of the linear channel going from the inlet mouth 235 of the duct 22 of the elbow 10 to the outlet 225 of the nozzle 224, different from the value shown with reference to the second embodiment of the mixing apparatus shown in FIG. 5. In greater detail, the length L of such linear channel is not lower than D and not larger than 20D (i.e. $D \leq L \leq 20D$), preferably not lower than 3D (i.e. $3D \leq L \leq 20D$), more preferably not larger than 15D (i.e. $3D \leq L \leq 15D$), still more preferably not larger than 10D (i.e. $3D \leq L \leq 10D$), even more preferably not lower than 5D (i.e. $5D \leq L \leq 10D$).

Moreover, further embodiments of the mixing apparatus with air gap disconnection according to the invention may comprise a flow straightener different from the one shown in FIG. 6, e.g. a conventional flow straightener such as, for instance, the flow straightener 260 shown in FIG. 9 that is formed by a plurality of parallel longitudinal tubes 261.

Furthermore, other embodiments of the mixing apparatus with air gap disconnection according to the invention may have a flow straightener located anywhere within the linear channel going from the inlet mouth 235 of the downstream duct 22 to the outlet 225 of the nozzle 224 of the valve 223, e.g. the flow straightener may be also located at least partially within the nozzle 224 of the valve 223.

Also, further embodiments of the mixing apparatus with air gap disconnection according to the invention may comprise a collecting duct that is separated from (and possibly even not provided with) the splash-guard device.

Making reference to FIGS. 10 and 11, a third embodiment of the mixing apparatus according to the invention comprises a venturi mixing device 40 comprising a body 41 having an inlet 42 and an outlet nozzle 321. Internally to the body 41, the mixing device 40 comprises a main flow small tube 5 wherein, upon the passage of water coming from the inlet 42, a low pressure is generated that results in an aspiration of the chemical product from an aspiration tube 6 (connected to an external tank through a mouth 82) and its dilution in water occurring in the outlet channel 325, starting from the aspiration chamber 322 and ending with the nozzle 321.

The outlet channel 325, preferably in correspondence with the nozzle 321, is provided with a mechanical device 43 for breaking the flow of the fluid that is mixed in the same outlet channel 325. In the embodiment of the mixing apparatus of FIGS. 10 and 11, the mechanical device 43 consists of a ring 44 internally provided with angularly equally spaced diametric longitudinal baffles 45 which are shaped in a fluid dynamic way, preferably so that they are tapered at the proximal end (i.e. the thickness at the proximal end of each baffle 45 is lower than the thickness at the distal end).

Other embodiments of the mixing apparatus according to the invention may have, alternatively or in combination with the mechanical device 43 of the mixing device 40 of FIGS. 10 and 11, at least one flow straightener that also operates for breaking the fluid flow in the outlet channel 325.

By way of example, and not by way of limitation, other embodiments of the mixing apparatus according to the invention may have the outlet channel 325 provided, preferably in correspondence with the nozzle 321, with the flow straightener 228 of FIG. 6 or with the flow straightener 260 of FIG. 9.

With reference to FIGS. 12 and 13, it may be observed that the magnetically actuated valve 2 of the previous three embodiments of the mixing apparatus according to the invention (visible only for the second embodiment of FIG. 5) comprises a perforated membrane 50, a shaped insert 51, a ferromagnetic metal pin 52 and an activation permanent magnet 57. The perforated membrane 50 is provided with a central through hole 48 and with a plurality of side through holes 49, the side holes 49 being preferably distributed along a circumference of diameter larger than the diameter of the inlet mouth of the duct 21 downstream, and it is attached to the shaped insert 51, preferably made of plastic, that inserts into the membrane central hole 48. In particular, the shaped insert 51 is formed by a substantially planar upper portion 46, provided with a side through hole 56 (not shown in FIG. 13), and by a lower shaped element 47 (that, in FIGS. 12 and 13, is shaped according to a cylindrical shape provided with longitudinal tongues external to the same cylindrical wall); a central through hole 53 passing through the whole shaped insert 51, i.e. both the upper portion 46 and the lower element 47. The pin 52, housed within a respective housing 62, is capable to interact with the central through hole 53 under a magnetic interaction with the activation permanent magnet 57, shaped as a perforated disc, capable to move longitudinally around the housing 62.

When the magnet 57 is in a position away from the inlet mouth of the duct 21 (as shown in FIG. 13a), the pin 52 is in the rest position (i.e. closing the valve 2) and it occludes the central hole 53 of the insert 51, whereby the water, coming from the supply, fills the main chamber 54 of the hydraulic cross connection 1, it passes through the side holes 49 of the membrane 50 and through the side hole 56 of the upper portion 46 of the insert 51, and it also fills the secondary chamber 55 where the pin 52 is. In this case, since the two chambers 54 and 55 have the same pressure, the membrane 50, also pushed by the pin 52 (in turn pushed by an internal spring 59 housed within the housing 62), rests on the side walls of the duct 21 (located upstream of the elbow 10 communicating with the separation valve assembly 3 and the subsequent mixing device 4), whereby the inlet mouth of the duct 21 remains closes (see FIG. 13a).

When the activation magnet 57 is actuated (e.g. by moving a pushbutton within which it is housed) by moving in a position closer to the inlet mouth of the duct 21 (as shown in FIG. 13b) by overcoming the resistance of an external spring 58, it magnetically interacts with the pin 51 that is pulled upwards, overcoming the resistance of the internal spring 59, and thus assuming an operating position wherein it clears the central hole 53 of the insert 51; as a consequence, the water is discharged from the secondary chamber 55 in the duct 21, generating a pressure difference between the main chamber 54 and the secondary chamber 55 pushing the membrane 50 upwards, clearing the inlet mouth of the duct 21 and letting the water pass from the main chamber 54 to the duct 21 (see FIG. 13b). In this regard, the pin 52 moves along its own longitudinal axis for assuming the rest position or the operating position. When from the operating position the pin returns to the rest position, the inlet mouth of the duct 21 is closed again to return to the situation shown in FIG. 13a.

With reference to FIGS. 14 and 15, it may be observed that a fourth embodiment of the mixing apparatus according to the invention comprises a magnetically actuated valve 60 comprising, similarly to the valve of FIGS. 12 and 13:
  a perforated membrane 50, provided with a central through hole and a plurality of side through holes 49,
  a shaped insert 51 that inserts into the central hole of the membrane 50 and that is formed by an upper portion 46, provided with a side through hole (not shown in FIGS. 14 and 15), and by a lower shaped element 47 and provided with a central through hole 53,
  a ferromagnetic metal pin 52 housed within a respective housing 62, and
  an activation magnet 61 housed within a corresponding housing 69.

The interaction among the pin 52, the central through hole 53 of the insert 51 and the inlet mouth of the duct 21 is similar to the case of the valve of FIGS. 12 and 13. In particular, the pin 52 may assume two positions: a rest position in which it closes the valve 60, and an operating position, in which it opens the valve 60. In particular, the pin 52 moves along its own longitudinal axis for assuming the rest position or the operating position.

More in detail, in the rest position the pin 52 occludes the central hole 53 of the insert 51 and the water, coming from the supply, fills the main chamber 54 of the hydraulic cross connection 1, it passes through the side holes 49 of the membrane 50 and of the upper portion 46 of the insert 51, and it also fills the secondary chamber 55 where the pin 52 is; since the two chambers have the same pressure, the membrane 50, also pushed by the pin 52 (in turn pushed by an internal spring 59 housed within the housing 62), rests on the side walls of the duct 21 communicating with the hydraulic circuit downstream of the activation valve 60, whereby the inlet mouth of the duct 21 remains closed (see FIG. 14a).

In the operating position, the pin 52 is moved upwards, overcoming the resistance of the internal spring 59, and it clears the central hole 53 of the insert 51 of the membrane 50; as a consequence (similarly to what occurs for the magnetically actuated valve of FIGS. 12 and 13), the water is discharged from the secondary chamber 55 in the duct 21, generating a pressure difference between the main chamber 54 and the secondary chamber 55 pushing the membrane 50 upwards, clearing the inlet mouth of the duct 21 and letting the water pass from the main chamber 54 to the duct 21 (see FIG. 14b).

The pin 52 is moved between the rest position and the operating position by the interaction with an activation magnet 61 shaped as a disc provided with a slot that is capable to slide around the housing 62 within which the pin 52 is housed. In other words, the activation magnet 61 is substantially U-shaped, so as to be capable to slide between two positions: a first position corresponding to the rest position of the pin 52, wherein (the housing 62 of) the latter is at a peripheral end of the slot (or, alternatively, outside the slot) where the interaction of the magnet 61 is not sufficient to move the pin 52 from the rest position overcoming the resistance of the internal spring 59 (see FIG. 14*a* and FIG. 15*a*); and a second position corresponding to the operating position of the pin 52, wherein (the housing 62 of) the latter is at a central end of the slot (or, alternatively, in a position inside the slot), i.e. at the centre of the disc of the magnet 61, where the interaction of the magnet 61 is sufficient to move the pin 52 for making it assume the operating position (see FIG. 14*b* and FIG. 15*b*).

The magnet 61 assumes the first and second positions by sliding on a plane orthogonal to the longitudinal axis of the pin 52. To this end, as better shown in FIG. 15, the magnetically actuated valve 60 is provided with a sliding mechanism integrally coupled to the magnet 61 actuatable by an operator so that a sliding of the sliding mechanism corresponds to a sliding of the magnet 61. In particular, the sliding mechanism shown in FIG. 15 comprises a slide 63 integrally coupled to two side pins (only the left pin 64 of which is visible in FIG. 15) capable to slide within two respective liners 65 by overcoming the resistance of respective springs (only the left spring 66 of which is visible in FIG. 15). The two side legs 67 of a fork structure 68 are integrally coupled to the two side pins 64, respectively; the fork structure 68 is integrally coupled to the magnet 61. Therefore, when the slide 63 is in a position projecting downwardly from the mixing apparatus housing, the magnet 61 is in the first position, corresponding to the rest position of the pin 52 (see FIG. 15*a*), whereas when the slide 63 is in a position more inside the mixing apparatus housing, the magnet 61 is in the second position, corresponding to the operating position of the pin 52 (see FIG. 15*b*).

Other embodiments of the mixing apparatus according to the invention may have an activation valve wherein the magnet 61 is slidable on a plane not strictly orthogonal to the axis of the pin 52; by way of example, and not by way of limitation, the sliding of the magnet 61 could be such that it allows an approach of the magnet 61 to the mouth of the duct 21 when it passes from the first position to the second one, for increasing the magnetic interaction of the same magnet 61 with the pin 52.

Further embodiments of the mixing apparatus according to the invention may have an activation valve wherein the magnet 61 has a shape different from the disc (e.g. it could be square or rectangular), though maintaining the presence of a slot.

Other embodiments of the mixing apparatus according to the invention may have an activation valve that may comprise mechanical means for opening and closing the valve 60 different from the perforated membrane 50 and from the insert 51 provided with central hole 53, although such different mechanical means must always interact with a ferromagnetic metal pin interacting with a magnet having a slot capable to slide around (the housing of) the pin when the magnet is moved by a slide. In particular, such mechanical means may also consist of an element integrally coupled to the ferromagnetic metal pin, such as for instance an end of such metal pin, whereby the interaction between mechanical means and pin may also consist in a movement of the mechanical means that is integral with a movement of the pin.

Further embodiments of the mixing apparatus according to the invention may have an activation valve that may have an inversion of the rest and operating positions of the pin, whereby in the rest position the latter opens the valve and in the operating position it closes the valve.

With reference to FIG. 16, it may be observed that a fifth embodiment of the mixing apparatus according to the invention comprises a hydraulic cross connection 90 comprising upstream of the valve 2 an inlet duct 70, for the connection to the water supply through a connector 105 (preferably upstream of which the connection with the supply comprises a tap for opening or closing the communication between inlet duct 70 and supply), and an outlet duct 71 closed through a stopper 106. It must be considered that the outlet duct 71 could be also connected to a hydraulic cross connection of another mixing apparatus (or to any other duct).

The connector 105 and the stopper 106 are attached to the inlet duct 70 and outlet duct 71, respectively, through corresponding quick coupling removable hooks 91 which are applied posteriorly, i.e. from the side of the hydraulic cross connection 90 facing the housing case (not shown in FIG. 16) that is mounted on the wall directly or through a bracket. The stopper 106 comprises a longitudinal tube 109, configured to be inserted into the outlet duct 71, that is provided with two sealing gaskets 107 and that has a circular notch 108 configured to interact with the hook 91, as it will be better illustrated later; similarly, the connector 105 comprises a longitudinal tube configured to be inserted into the inlet duct 70, that is provided with one or more sealing gaskets and that has a circular notch, similar to the notch 108 of the stopper 106, configured to interact with the respective hook 91.

Making reference also to FIG. 17, each one of the quick coupling removable hooks 91 is insertable into a seat 100 obtained on the outer wall of the outlet duct 71 (an identical seat is present on the outer wall of the inlet duct 70); each quick coupling removable hook 91 comprises two pairs symmetric to each other of front elastic arms, each one comprising an inner front elastic arm 93 and an outer front elastic arm 94, each pair being configured to insert into one of two corresponding side slots 92 of the seat 100.

A tooth 96 that is present on each one of the outer front elastic arms 94, by interacting as a stop with a side edge 97 of the respective side slot 92 of the seat 100, is configured to prevent the hook 91 from sliding in an unforced way outside the seat (i.e. unless an operator press the outer front elastic arms 94 towards the inner front elastic arms 93), whereas a frontally projecting element 103 of the seat 100 is provided with two stopping side elements 101 interacting with the ends 111 of the two inner front elastic arms 93 for maintaining the correct angular orientation of the hook 91 with respect to the axis of the outlet duct 71; moreover, the seat 100 further comprises two pairs of shaped ribs 102 projecting from the outer wall of the duct 71, which contribute (along with the side edge 97 joining them) to form the side slots 92, and which maintains the longitudinal position of the hook 91. A shaped profile of the external edge of each one of the outer front elastic arms 94, ending with a projection 104, advantageously interacts with the side edge 97 of the respective side slot 92 of the seat 100 for favouring the correct radial positioning of the hook 91, i.e. its positioning at the correct distance from the longitudinal axis of the outlet duct 71.

FIG. 17 shows a portion of the housing case 99 housing the hydraulic cross connection 90; in particular, the housing case 99 is configured to be mounted, preferably in a removable way, on a rear planar support 98 (that may comprise or consist of a bracket or a mounting wall). The removable hook 91 further comprises two rear arms 95, symmetric to each other, interacting as stops with the bracket 98, mounted on a wall, on which the housing case 99 of the hydraulic cross connection 90 is mounted; in particular, the reference numeral 98 of FIG. 17 could also indicate the wall on which the case 99 can be directly mounted. In this regard, the housing case 99 comprises one or more supporting rear elements, each one having a supporting free end configured to rest on the rear planar support 98 when the housing case 99 is mounted on the same rear planar support 98 (that may comprise or consist of a bracket or a mounting wall). By way of example and not by way of limitation, the housing case 99 may comprise as supporting rear element a rear wall of the same case, which rear wall is configured to be attached, preferably in a removable way, to a supporting planar wall, e.g. by means of screws removably insertable, thanks to through holes of such rear wall, into corresponding block inserted into the supporting planar wall, or by means of bolts removably anchored, thanks to through holes of such rear wall, to a supporting planar bracket or through clamps removably securable to a supporting planar bracket; in this case, the free surface operates as supporting free end of the rear wall, in turn operating as supporting rear element, of the housing case 99. Still by way of example and not by way of limitation, the housing case 99 may comprise, as supporting rear elements, supporting projecting elements, as for instance pins 9000, the free ends 9001 of which operate as supporting free ends; in this case, the housing case 99 may be mounted, preferably in a removable way, on a supporting planar wall or a supporting planar bracket through securing means as screws, bolts, and clamps.

As shown in FIG. 17a, when the removable hook 91 is correctly closed, it is secured in the seat 100 so that the two pairs of front elastic arms, 93 and 94, are inserted into the respective two slots 92, the two inner front elastic arms 93 interact as stops with the two side elements 101 of the frontally projecting element 103, and the two rear arms 95 interact as stops with the mounting bracket (or the wall) 98, since the housing case 99 of the hydraulic cross connection is shaped such that, when mounted on the mounting bracket (or on the wall) 98, the distance separating the seat 100 from the mounting bracket (or from the wall) 98 is the minimum distance that is sufficient for housing (the rear portion of the hook 91 and) the two rear arms 95 of the hook 91. Such distance is equal to the distance separating the seat 100 from the supporting free ends of said one or more supporting rear elements of the housing case 99 (i.e., in FIG. 3, to the distance separating the seat 100 from the free ends 9001 of the supporting pins 9000). In such attachment configuration, an internal edge 110 of each one of the two inner front elastic arms 93 inserts into the notch 108 of the stopper 106 and it interacts as a stop with the ends of the adjacent portions of the tube 109 delimiting the notch 108 (only the end 112 of the proximal portion is visible in FIG. 17), keeping the stopper 106 locked.

In particular, in the present description and claims it must be understood that the distance separating the seat 100 from the supporting free ends of said one or more supporting rear elements of the housing case 99 (i.e. the distance separating the seat 100 from the mounting bracket 98 or from the wall) is equal to the length of the minimum straight line separating the base of the notch 108 from the planar surface passing through the supporting free ends of said one or more supporting rear elements of the housing case 99 (i.e. the minimum straight line separating the base of the notch 108 from the bracket or from the wall 98).

In order that the stopper 106 can be released from the outlet duct 71, it is necessary that the removable hook 91 moves posteriorly to the hydraulic cross connection 90, as shown in FIG. 17b, until the internal edge 110 of each one of the two inner front elastic arms 93 exits from the notch 108 of the stopper 106 allowing the latter to move longitudinally. However, in order that this is possible, it is further necessary that there is the space required by the posterior movement of the two rear arms 95, and such condition only occurs when the housing case 99 of the hydraulic cross connection 90 is not mounted on the mounting bracket (or on the wall) 98, i.e. in a condition wherein the hydraulic cross connection is disconnected from the supply. In other words, the stopper 106 may exit from the outlet duct 71 only if the housing case 99 of the hydraulic cross connection 90 is not mounted on the mounting bracket (or on the wall) 98, since otherwise the mounting bracket (or the wall) 98 prevents the hook 91 from opening.

With reference to FIG. 18, it may be observed that a sixth embodiment of the mixing apparatus according to the invention comprises a hydraulic cross connection differing from that illustrated with reference to FIGS. 16 and 17 by the fact that the housing case 99 of the hydraulic cross connection 90 is shaped so that, when mounted on the wall (or on the mounting bracket) 98, the distance separating the seat 100 from the supporting free ends of said one or more supporting rear elements of the housing case 99 (i.e. the distance separating the seat 100 from the free ends 9001 of the supporting pins 9000, that is equal to the distance separating the seat 100 from the mounting bracket—or from the wall—98) is longer than the minimum distance that is sufficient for housing the two rear arms 95 of the hook 91; in particular, such distance is equal to the sum of the minimum distance sufficient for housing the two rear arms 95 of the hook 91 with a second distance shorter than the depth of the notch 108 of the stopper 106. In such case, when the housing case 99 of the hydraulic cross connection 90 is mounted on the wall (or on the mounting bracket) 98, the hook 91 cannot in any case move posteriorly to the hydraulic cross connection 90 by a distance that is sufficient to the internal edge 110 of each one of the two inner front elastic arms 93 for exiting from the notch 108 of the stopper 106, thus preventing the latter from moving longitudinally.

In general, the housing case 99 of the hydraulic cross connection 90 is shaped so that the distance separating the seat 100 from a planar surface passing through each supporting free end of said one or more supporting rear elements of the housing case 99 (e.g. the distance separating the seat 100 from a planar surface passing through the free ends 9001 of the supporting pins 9000 in FIGS. 3 and 4), that is equal to the distance separating the seat 100 from the wall (or from the mounting bracket) 98 (when the housing case 99 is mounted on the mounting bracket—or on the wall—98), ranges from a minimum value equal to the minimum distance that is sufficient for housing the two rear arms 95 of the hook 91, including such minimum value, and a maximum value equal to the sum of the minimum distance that is sufficient for housing the two rear arms 95 of the hook 91 with the depth of the notch 108 of the stopper 106, excluding such maximum value.

What described above with reference to the stopper 106 is also valid with reference to the connector 105.

Other embodiments of the mixing apparatus according to the invention comprise a hydraulic cross connection that may have the hook comprising, instead of two pairs symmetric to each other of front elastic arms, two front elastic arms symmetric to each other, each one of which may be shaped so as to comprise the tooth 96 and/or the ends 111 and/or an external edge having a shaped profile ending with the projection 104 and/or the internal edge 110.

Further embodiments of the mixing apparatus according to the invention comprise a hydraulic cross connection that may have the hook comprising, instead of two rear arms 95, a single rear arm. By way of example, FIG. 19 shows an embodiment of the hydraulic cross connection according to the invention differing from the one shown in FIG. 16 by the fact that the hook 991 comprises a single arc-shaped rear arm 995 that projects posteriorly from the hook 991 (whereas the other elements of the hook 991 are the same ones of the hook 91 of FIGS. 16-18). As schematically shown in FIG. 20 for the attachment configuration (FIG. 20a) and for the open configuration (FIG. 20b), the operation of the hook 991 is similar to that of the hook 91 schematically shown in FIG. 17.

Also, other embodiments of the mixing apparatus according to the invention comprise a hydraulic cross connection that may have mechanical means for positioning the hook different from the two side slots 92 comprising the side edge 97 of the seat 100, and/or from the frontally projecting element 103 of the seat 100 provided with two stopping side elements 101, and/or from the ends of the portions of the tube 109 delimiting the notch 108.

The preferred embodiments of this invention have been described and a number of variations have been suggested hereinbefore, but it should be understood that those skilled in the art can make other variations and changes, without so departing from the scope of protection thereof, as defined by the enclosed claims.

The invention claimed is:

1. A flexible membrane separation valve, comprising a housing, the lateral surfaces of which are provided with slits, within which housing a hollow flexible membrane with cylindrical symmetry is housed, within which an insert having a body with cylindrical symmetry is in turn housed, the insert comprising a proximal end having a proximal apex spaced along the longitudinal axis of the insert from a base with cylindrical symmetry, through which the proximal end joins to the body, the proximal apex being joined to the base through a continuous surface, wherein the proximal end has an axial section such that tangent lines to the proximal apex form an angle containing the longitudinal axis of the insert that is lower than or equal to 90° and wherein the insert is provided with a side notch in a longitudinal position corresponding to a distal internal edge of the housing.

2. The valve according to claim 1, wherein the continuous surface of the insert, through which the proximal apex is joined to the base, is an ogival surface or a conical surface, whereby said conical surface has an apex angle θ lower than or equal to 90°.

3. The valve according to claim 1, wherein the continuous surface of the insert, through which the proximal apex is joined to the base, is a surface with axial symmetry.

4. The valve according to claim 1, wherein the proximal apex of the insert is misaligned with respect to a longitudinal axis of the body of the insert.

5. A flexible membrane separation valve, comprising a housing, the lateral surfaces of which are provided with slits, within which housing a hollow flexible membrane with cylindrical symmetry is housed, within which an insert having a body with cylindrical symmetry is in turn housed, the insert comprising a proximal end having a proximal apex spaced along the longitudinal axis of the insert from a base with cylindrical symmetry, through which the proximal end joins to the body, the proximal apex being joined to the base through a continuous surface, wherein the proximal end has an axial section such that tangent lines to the proximal apex form an angle containing the longitudinal axis of the insert that is lower than or equal to 90°, wherein the insert comprises a distal circular base having a diameter D2 larger than a diameter D1 of the body of the same insert by an amount ranging from 3% to 15%, whereby:

$$1.03 \cdot D1 \leq D2 \leq 1.15 \cdot D1.$$

6. An apparatus for mixing a liquid drawn from a supply with one or more concentrated chemical products, comprising a mixing device downstream of a separation valve, wherein said separation valve is a flexible membrane separation valve comprising a housing, the lateral surfaces of which are provided with slits, within which housing a hollow flexible membrane with cylindrical symmetry is housed, within which an insert having a body with cylindrical symmetry is in turn housed, the insert comprising a proximal end having a proximal apex spaced along the longitudinal axis of the insert from a base with cylindrical symmetry, through which the proximal end joins to the body, the proximal apex being joined to the base through a continuous surface, wherein the proximal end has an axial section such that tangent lines to the proximal apex form an angle containing the longitudinal axis of the insert that is lower than or equal to 90° and wherein the insert is provided with a side notch in a longitudinal position corresponding to a distal internal edge of the housing.

7. The mixing apparatus according to claim 6, comprising a first duct, having an inlet mouth and a diameter D, connected to an air gap valve comprising a nozzle having an outlet spaced apart by a separation distance from a collecting duct, the first duct and the air gap valve forming a linear channel upstream of the outlet of the nozzle, going from the inlet mouth of the first duct to the outlet of the nozzle and having a length L, the length L being not shorter than D and not longer than 20D, i.e.

$$D \leq L \leq 20D,$$

wherein said linear channel is provided with a flow straightener.

8. The mixing apparatus according to claim 7, wherein the length L is not shorter than 3D, i.e.

$$3D \leq L \leq 20D.$$

9. The mixing apparatus according to claim 8, wherein the length L is not longer than 15D, i.e.

$$3D \leq L \leq 15D.$$

10. The mixing apparatus according to claim 9, wherein the length L is not longer than 10D, i.e.

$$3D \leq L \leq 10D.$$

11. The mixing apparatus according to claim 10, wherein the length L is not shorter than 5D, i.e.

$$5D \leq L \leq 10D.$$

12. The mixing apparatus according to claim 7, wherein the flow straightener has a shape with cylindrical symmetry capable to be housed within the first duct in correspondence with a distal end thereof, the shape of the flow straightener comprising a proximal end pointing at a direction opposite to the fluid flow direction and shaped as an ogive and a plurality of angularly equally spaced coaxial longitudinal tongues, and wherein the nozzle is housed in a proximal portion of the gap valve, the separation distance is obtained within a distal portion of the valve, and the proximal portion is coupled to the distal portion through a male-female connection wherein the proximal portion is provided with male connector and the distal portion is provided with corresponding female connector, and wherein the collecting duct is integrated in a splash-guard device, and belongs to the gap valve or constitutes an inlet of a downstream mixing device, the splash-guard device having a cylindrical wall internally provided with longitudinal tongues shaped according to a fluid dynamic profile, each longitudinal tongue being shaped so that an edge thereof has a varying distance from said cylindrical wall and not decreasing from an inlet end to an outlet end of the splash-guard device according to a curvilinear profile that starts, at the proximal end, from said cylindrical wall of the splash-guard device, and wherein the first duct is located downstream of an elbow formed by a second duct upstream of the elbow and by the first duct, whereby said linear channel goes from the elbow to the outlet of the nozzle of the gap valve, the first duct being part of a hydraulic cross connection, located upstream of the gap valve, controlled by a magnetically actuated valve.

13. The mixing apparatus according to claim 6, further comprising a venturi mixing device comprising a body having an inlet and an outlet nozzle, and, internally to the body, a main flow small tube communicating with the inlet and with an aspiration chamber, a tube being in communication with the aspiration chamber and with a mouth communicating with the outside, an outlet channel being in communication with the aspiration chamber and ending with the outlet nozzle, the outlet channel being provided with mechanical means, located in correspondence with the outlet nozzle, capable to break a flow of a mixed fluid coming from the aspiration chamber.

14. The mixing apparatus according to claim 13, wherein said mechanical means comprises a mechanical device consisting of a ring internally provided with angularly equally spaced diametric longitudinal baffles, tapered at a proximal end, wherein said mechanical means comprises a flow straightener having a shape with cylindrical symmetry, comprising a proximal end pointing at a direction opposite to the fluid flow direction and shaped as an ogive and a plurality of angularly equally spaced coaxial longitudinal tongues.

15. The mixing apparatus according to claim 13, wherein said mechanical means comprises a flow straightener formed by a plurality of parallel longitudinal tubes.

16. The mixing apparatus according to claim 6, further comprising a magnetically actuated valve comprising:
mechanical means for opening and closing the valve, so as to be capable to occlude and clear, respectively, a mouth of a duct mounted downstream of the magnetically actuated valve,
at least one ferromagnetic metal pin mobile between a rest position and an operating position, and
at least one activation magnet mobile between a first position and a second position, said mechanical means being capable to interact with said at least one ferromagnetic metal pin so that when said at least one ferromagnetic metal pin is in a primary position, selected between said rest position and said operating position, said mechanical means closes the magnetically actuated valve, and when said at least one ferromagnetic metal pin is in a secondary position, selected between said rest position and said operating position and different from said primary position, said mechanical means opens the magnetically actuated valve, said at least one activation magnet being capable to magnetically interact with said at least one ferromagnetic metal pin so that when said at least one activation magnet is in said first position said at least one ferromagnetic metal pin is in said primary position, and when said at least one activation magnet is in said second position said at least one ferromagnetic metal pin is in said secondary position, the magnetically actuated valve comprising sliding mechanical means comprising a slide integrally coupled to said at least one activation magnet and mobile between an initial position and a final position, whereby said at least one activation magnet is slidable between said first and second positions so that when said sliding mechanical means is in said initial and final positions said at least one activation magnet is, respectively, in said first and second positions, said at least one activation magnet being shaped so as to comprise a slot capable to slide around said at least one ferromagnetic metal pin so that when said sliding mechanical means is in a non-interacting position, selected between said initial and final positions, said at least one ferromagnetic metal pin is in said rest position wherein said at least one activation magnet does not interact with the same, and when said sliding mechanical means is in an interacting position, selected between said initial and final positions different from the non-interacting position, said at least one ferromagnetic metal pin is moved in said operating position by an interaction with said at least one activation magnet.

17. The mixing apparatus according to claim 16, wherein said primary position consists in said rest position of said at least one ferromagnetic metal pin, and said secondary position consists in said operating position of said at least one ferromagnetic metal pin, and wherein said non-interacting position consists in said initial position of said sliding mechanical means, and said interacting position consists in said final position of said sliding mechanical means, and wherein, when said sliding mechanical means is in said non-interacting position, said at least one ferromagnetic metal pin is in correspondence with a peripheral end of the slot or at the outside of the slot, and when said sliding mechanical means is in said interacting position, said at least one ferromagnetic metal pin is in correspondence with the inside of the slot at a slot end within said at least one activation magnet, and wherein said at least one activation magnet is shaped as a disc provided with a slot, and wherein said at least one ferromagnetic metal pin is mobile between said rest position and said operating position along its own longitudinal axis, said at least one activation magnet being slidable between said first and second positions on a plane orthogonal to said longitudinal axis of said at least one ferromagnetic metal pin, and wherein said sliding mechanical means further comprises two side pins, integrally coupled to the slide, capable to slide within two respective liners, opposed by respective springs, a fork structure having two side legs integrally coupled to the two side pins, respectively, the fork structure being integrally coupled to said at least one activation magnet, and wherein said mechanical means for opening and closing the magnetically actuated valve comprises a perforated membrane attached to an insert provided with at least one hole capable to communicate with said mouth of the duct mounted downstream of the magnetically actuated valve, said at least one ferromagnetic metal pin interacting with at least one corresponding inner opposing spring tending to make said at least one ferromagnetic metal pin assume said rest position, said at least one ferromagnetic metal pin being capable to interact with said at least one hole of the insert so that in said primary position said at least one ferromagnetic metal pin occludes said at least one hole of the insert, and in said secondary position said at least one ferromagnetic metal pin clears said at least one hole of the insert, said at least one ferromagnetic metal pin and said at least one corresponding inner opposing spring being housed in at least one respective housing around which the slot of said at least one activation magnet is capable to slide.

18. The mixing apparatus according to claim 6, further comprising:
a hydraulic cross connection, housed in a housing case configured to be mounted on a rear planar support, the housing case comprising one or more supporting rear elements, each one having a free supporting end configured to rest on the rear planar support when the housing case is mounted on the same rear planar support, the hydraulic cross connection comprising at least one inlet duct and/or at least one outlet duct,
at least one tubular element having a longitudinal tube removably insertable in each one of said at least one inlet duct and/or at least one outlet duct, the longitudinal tube externally comprising a circular notch, having a depth, delimited by ends of two portions of the longitudinal tube adjacent to the circular notch, at least one quick coupling removable hook, configured to be inserted in a seat obtained on an outer wall of each one of said at least one inlet duct and/or at least one outlet duct, said at least one removable hook comprising at least one first front elastic arm and at least one second front elastic arm configured to interact with the seat and with the ends of the two portions of the longitudinal tube delimiting the circular notch of the longitudinal tube when inserted in one of said at least one inlet duct and/or at least one outlet duct to which the seat belongs for locking the longitudinal tube, said at least one quick coupling removable hook being configured to be posteriorly inserted in the seat and comprising at least one rear arm, a distance separating the seat of each one of said at least one inlet duct and/or at least one outlet duct from a planar surface passing through each free supporting end of said one or more supporting rear elements of the housing case ranging from a minimum value equal to the minimum distance sufficient for housing said at least one rear arm when said at least one removable hook is inserted in the seat, including such minimum value, and a maximum value equal to the sum of the minimum distance sufficient for housing said at least one rear arm when said at least one removable hook is inserted in the seat with said depth of the notch of the longitudinal tube when inserted in one of said at least one inlet duct and/or at least one outlet duct to which the seat belongs, excluding such maximum value, whereby said at least one removable hook is removable from the seat and the longitudinal tube is extractable from the inlet or outlet duct to which the seat belongs only when the housing case is not mounted on the rear planar support.

19. The mixing apparatus according to claim 18, wherein said distance separating the seat of each one of said at least one inlet duct and/or at least one outlet duct from the rear planar support is equal to the minimum distance sufficient for housing said at least one rear arm when said at least one removable hook is inserted in the seat, and wherein said at least one quick coupling removable hook comprises a first inner front elastic arm, a first outer front elastic arm, a second inner front elastic arm, and a second outer front elastic arm, the first and the second inner front arms being configured to interact with the ends of the two portions of the longitudinal tube delimiting the circular notch of the longitudinal tube when inserted in one of said at least one inlet duct and/or at least one outlet duct to which the seat belongs for locking the longitudinal tube, the first inner front elastic arm and the first outer front elastic arm being symmetric, respectively, to the second inner front elastic arm and to the second outer front elastic arm, and wherein said at least one quick coupling removable hook comprises two rear arms symmetric to each other, and wherein the seat of each one of said at least one inlet duct and/or at least one outlet duct comprises positioning mechanical means configured to interact with said at least one first front elastic arm and at least one second front elastic arm for positioning said at least one removable hook in the seat, said positioning mechanical means comprising two side slots formed by two shaped ribs projecting from the outer wall of the inlet or outlet duct to which the seat belongs and by two respective side edges joining said two ribs, said at least one first front elastic arm and at least one second front elastic arm being configured to insert in the two side slots which keep a longitudinal position of said at least one removable hook with respect to an axis of the inlet or outlet duct to which the seat belongs, said positioning mechanical means further comprising a frontally projecting element provided with two stopping side elements configured to interact with two corresponding ends of said at least one first front elastic arm and at least one second front elastic arm for angularly orientating said at least one removable hook with respect to the axis of the inlet or outlet duct to which the seat belongs, the two side edges being configured to interact with respective outer edges of said at least one first front elastic arm and at least one second front elastic arm, each one of which outer edges having a shaped profile ending with a projection, for radially positioning said at least one removable hook with respect to the axis of the inlet or outlet duct to which the seat belongs, wherein the two side edges are configured to interact as stops with respective teeth of said at least one first front elastic arm and at least one second front elastic arm for preventing said at least one removable hook from sliding in an unforced way outside the seat, and wherein said at least one tubular element is selected from the group comprising a connector and a closing stopper.

* * * * *